(12) United States Patent
Fukuoka et al.

(10) Patent No.: US 10,048,538 B1
(45) Date of Patent: Aug. 14, 2018

(54) DISPLAY DEVICE

(71) Applicant: Sharp Kabushiki Kaisha, Sakai, Osaka (JP)

(72) Inventors: Kenta Fukuoka, Sakai (JP); Kenji Takase, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 9 days.

(21) Appl. No.: 15/516,435

(22) PCT Filed: Aug. 10, 2015

(86) PCT No.: PCT/JP2015/072623
§ 371 (c)(1),
(2) Date: Apr. 3, 2017

(87) PCT Pub. No.: WO2016/056298
PCT Pub. Date: Apr. 14, 2016

(30) Foreign Application Priority Data

Oct. 8, 2014 (JP) .................................. 2014-207210

(51) Int. Cl.
*G02F 1/1335* (2006.01)
*G09G 3/36* (2006.01)
*F21V 8/00* (2006.01)
*G02F 1/133* (2006.01)

(52) U.S. Cl.
CPC ..... *G02F 1/133603* (2013.01); *G02B 6/0013* (2013.01); *G02F 1/13306* (2013.01); *G02F 1/133528* (2013.01); *G09G 3/36* (2013.01)

(58) Field of Classification Search
CPC ......... G02F 1/133603; G02F 1/133528; G02F 1/13306; G02B 6/0013; G09G 3/36
See application file for complete search history.

(56) References Cited

U.S. PATENT DOCUMENTS

| | | | | |
|---|---|---|---|---|
| 2012/0140147 A1* | 6/2012 | Satoh | ..................... | G03B 21/28 349/62 |
| 2014/0292839 A1* | 10/2014 | Huang | .............. | G02F 1/133533 345/694 |
| 2014/0313456 A1* | 10/2014 | Fujino | ............... | G02F 1/133528 349/62 |

(Continued)

FOREIGN PATENT DOCUMENTS

WO   2014/010585 A1   1/2014

*Primary Examiner* — Andrew Sasinowski
(74) *Attorney, Agent, or Firm* — Keating & Bennett, LLP

(57) ABSTRACT

Provided is a display device serving as a see-through display which is capable of ensuring the clarity of a displayed image while maintaining high transparency and is less likely to be limited in terms of the location of installation.

A dot-printed light-emitting area of a light guiding plate (60) emits, as backlight, light whose intensity is so high that the intensity of ambient light can be negligible, and therefore, the observer on the front side of a liquid crystal display device (10) is able to see a clear image displayed in an image display area (75) of a liquid crystal panel (20). Moreover, ambient light is transmitted through a light-transmissive area (72) of the light guiding plate (60) to be incident on a transparent display area of the liquid crystal panel (20), and therefore, the observer can see a background displayed with high transparency in the transparent display area (76).

19 Claims, 18 Drawing Sheets

(56) References Cited

U.S. PATENT DOCUMENTS

| | | | |
|---|---|---|---|
| 2014/0320782 A1* | 10/2014 | Uhm | G02F 1/155 349/62 |
| 2014/0369072 A1* | 12/2014 | Liao | G02B 6/0068 362/613 |
| 2017/0069281 A1* | 3/2017 | Fukuoka | G09G 3/346 |

* cited by examiner

DISPLAY DEVICE

TECHNICAL FIELD

The present invention relates to display devices, particularly to a display device serving as a see-through display through which a background is seen.

BACKGROUND ART

Recent years have seen active development of see-through display technology and a gradual increase in products with see-through displays being put on the market. See-through displays are generally categorized into two types: "box type" referring to a liquid crystal display device with a box-like backlighting portion; and "stand-alone type" eliminating the need for the box of the backlighting portion. Of these, the box type is relatively easy to be produced but has a problem where the visible range of transparent display is limited to the bounds of the box. On the other hand, the stand-alone type allows everything in the background to be seen.

Patent Document 1 discloses a see-through display of a stand-alone type. This see-through display allows most of the light emitted by a light guiding plate to pass to the back side and illuminate the background, thereby ensuring high transparency. Moreover, light reflected toward the front side by an object in the background illuminates a liquid crystal panel as backlight, thereby displaying an image on the liquid crystal panel. In this manner, the see-through display described in Patent Document 1 realizes high transparency and also insure the clarity of a displayed image.

CITATION LIST

Patent Document

Patent Document 1: International Publication WO 2014/010585

SUMMARY OF THE INVENTION

Problems to be Solved by the Invention

See-through displays require high pixel transmittance not only when white display is provided but also when transparent display is provided. However, in the case of the see-through display described in Patent Document 1, if pixel transmittance is increased, each pixel provides mixed display of an image and a background, so that the clarity of a displayed image is compromised. Moreover, to realize high transparency, it is necessary to make light emitted by the light guiding plate less likely to escape toward the front side of the display because such escaping light toward the front side cannot be utilized as backlight. The see-through display as above requires that an object which reflects light from the light guiding plate toward the front side is present on the back side, resulting in a problem where the location in which to install the see-through display is limited.

Therefore, an objective of the present invention is to provide a display device serving as a see-through display which is capable of ensuring the clarity of a displayed image while maintaining high transparency and is less likely to be limited in terms of the location of installation.

Means for Solving the Problems

A first aspect of the present invention is directed to a display device functioning as a see-through display, the device including:

a first display panel configured to control a polarization direction of light on the basis of externally provided first image information, thereby displaying a first image or becoming transparent to allow ambient light incident from a back side to be transmitted therethrough to display a background;

first and second polarizing plates respectively affixed to front and back surfaces of the first display panel; and a display light source including a light guiding plate configured to emit incident light toward the first display panel and a light source attached to an edge of the light guiding plate, the display light source being configured to irradiate the first display panel with light emitted by the light source via the light guiding plate, wherein, the first display panel includes an image display area in which the first image is displayed and a transparent display area in which the background is displayed, the transparent display area surrounding the image display area, and the light guiding plate includes a light-emitting area and a light-transmissive area, the light-emitting area directing light emitted by the light source toward the image display area, the light-transmissive area transmitting ambient light incident from the back side therethrough toward the transparent display area.

A second aspect of the present invention provides the display device according to the first aspect of the present invention, wherein the light-emitting area formed in the light guiding plate has formed on a front or back surface a dot pattern with a plurality of dots for reflecting or scattering incident light from the light source.

A third aspect of the present invention provides the display device according to the first aspect of the present invention, wherein the light-emitting area formed in the light guiding plate has a scattering film containing a scattering material and affixed to a front or back surface or a coating film formed of the scattering material on the front or back surface, the scattering material scattering incident light from the light source.

A fourth aspect of the present invention provides the display device according to the third aspect of the present invention, wherein the scattering film or the coating film has a haze of 10% or less.

A fifth aspect of the present invention provides the display device according to the first aspect of the present invention, wherein each of the first and second polarizing plates has the same size as the image display area formed in the first display panel.

A sixth aspect of the present invention provides the display device according to the first aspect of the present invention, wherein at least the second polarizing plate and the scattering film containing the light-scattering material for scattering incident light from the light source are stacked, first and second adhesive layers respectively adhere to front surfaces of the second polarizing plate and the scattering film and the stack is fixed between the first display panel and the light guiding plate by sticking the first adhesive layer to the image display area and the second adhesive layer to the light emitting area.

A seventh aspect of the present invention provides the display device according to the fifth aspect of the present invention, wherein both the first and second polarizing plates are absorptive polarizing plates.

An eighth aspect of the present invention provides the display device according to the seventh aspect of the present invention, further including a first reflective polarizing plate having the same size as the first polarizing plate, wherein the first reflective polarizing plate is affixed to a front surface of the first polarizing plate.

A ninth aspect of the present invention provides the display device according to the seventh aspect of the present invention, further including a second reflective polarizing plate having the same size as the second polarizing plate, wherein the second reflective polarizing plate and the second polarizing plate are affixed to the back surface of the first display panel in this order.

A tenth aspect of the present invention provides the display device according to the first aspect of the present invention, wherein each of the first and second polarizing plates is the same size as the first display panel.

An eleventh aspect of the present invention provides the display device according to the tenth aspect of the present invention, further comprising a third reflective polarizing plate having the same size as the first display panel, wherein the third reflective polarizing plate and the second polarizing plate are affixed to the back surface of the first display panel in this order.

A twelfth aspect of the present invention provides the display device according to the second aspect of the present invention, further including a scattering liquid crystal panel between the second polarizing plate affixed to the back surface of the first display panel and the light guiding plate, the scattering liquid crystal panel being the same size as the image display area and having a scattering area injected with scattering liquid crystals, wherein, the scattering area is formed in a position corresponding to the light-emitting area and becomes transparent or cloudy depending on whether a voltage is applied to the scattering area.

A thirteenth aspect of the present invention provides the display device according to the tenth aspect of the present invention, further including a light-shielding plate with a light-shielding area formed of a blackout material in a position corresponding to the light-emitting area, wherein the light-shielding plate is disposed behind the light guiding plate.

A fourteenth aspect of the present invention provides the display device according to the tenth aspect of the present invention, further including a third polarizing plate having the same size as the light guiding plate, wherein the third polarizing plate is disposed behind the light guiding plate.

A fifteenth aspect of the present invention provides the display device according to the tenth aspect of the present invention, further including a second display panel including a liquid crystal area injected with liquid crystals, wherein the liquid crystal area is sandwiched between two polarizing plates disposed behind the light guiding plate, each polarizing plate having the same size as the liquid crystal area.

A sixteenth aspect of the present invention provides the display device according to the fifteenth aspect of the present invention, wherein the liquid crystal area is a single area switching between states of being transparent and light-shielding in accordance with an applied voltage.

A seventeenth aspect of the present invention provides the display device according to the fifteenth aspect of the present invention, wherein the liquid crystal area includes a plurality of pixels and displays a second image different from the first image with the pixels by controlling a polarization direction of light escaping from the display light source toward the back side, on the basis of externally provided second image information.

An eighteenth aspect of the present invention provides the display device according to the seventeenth aspect of the present invention, wherein the two polarizing plates have respective transmission axes parallel to each other.

A nineteenth aspect of the present invention provides the display device according to the seventeenth aspect of the present invention, wherein the two polarizing plates have respective transmission axes perpendicular to each other.

Effect of the Invention

In the first aspect, the light guiding plate emits light from the light-emitting area toward the image display area of the first display panel, and the intensity of the light is so high that the intensity of ambient light incident from the back side can be negligible, whereby the observer on the front side of the display device is able to see the first image clearly displayed in the image display area of the first display panel. Moreover, ambient light is transmitted through the light-transmissive area of the light guiding plate to be incident on the transparent display area of the first display panel, and therefore, the observer is able to see a background displayed with high transparency in the transparent display area. Thus, the display device functions as a see-through display which both achieves high transparency and displays the first image clearly. Moreover, the image display area is provided at a distance from the edge of the first display panel, and therefore, the light-emitting area corresponding thereto is also provided at a distance from the edge of the light guiding plate. Accordingly, light from each light source is homogenized within the light guiding plate before illuminating the image display area. As a result, the bright-spot phenomenon becomes less likely to occur, resulting in enhanced display quality for the first image. Moreover, the display device is of a stand-alone type, and therefore, is not limited in terms of the location of installation.

In the second aspect, the light-emitting area can be readily formed in a desired shape by forming a dot pattern on the front or back surface of the light guiding plate using a simple method such as printing. Moreover, by controlling, for example, dot coverage and density in the light-emitting area, it is possible to readily adjust the intensity and the intensity distribution of light emitted from the light-emitting area or the transparency of the light-emitting area.

In the third aspect, the light guiding plate has the scattering film affixed to the front surface or the light guiding plate is coated with the light-scattering material on the front surface, whereby the light guiding plate emits light only from the area to which the scattering film is affixed or the area on which the coating film is formed, as in the case where the dots are printed. Moreover, the scattering film and the coating film made of the light-scattering material contain very fine scattering particles randomly dispersed therein, and therefore, even if the films overly the pixel pattern of the first display panel, no moire pattern occurs, so that image display quality can be prevented from being reduced. In addition, the scattering film is easy to handle upon affixing to the light guiding plate, and the coating film can be formed at a desired position with accuracy.

In the fourth aspect, the scattering film or the coating film has a haze of 10% or less. As a result, when no light is emitted, the scattering film or the coating film has high transparency so that a background can be clearly seen therethrough.

In the fifth aspect, the image display area of the first display panel has the polarizing plate affixed thereto, and therefore, can display a clear image, as in the case of the first aspect. On the other hand, the transparent display area has no polarizing plate affixed thereto, and therefore, the background is displayed with higher transparency than in the case of the first embodiment. Moreover, when the light-emitting area of the light guiding plate and the first and second polarizing plates affixed to the first display panel are provided in the same shape, such a shape can be designed to be a desired shape. Thus, unlike in the case of non-rectangular displays recently introduced into the market, the first display panel is not required to be designed exclusively, and the first display panel provided in the shape of a rectangle can display an image in the image display area provided in a desired shape.

In the sixth aspect, the stack, which includes the second polarizing plate and the scattering film integrally formed therewith, is disposed between the first display panel and the light guiding plate, and further, the stack is fixed to the image display area of the first display panel by the first adhesive layer and also fixed to the light-emitting area of the light guiding plate by the second adhesive layer. Thus, the light-emitting area of the light guiding plate and the image display area of the first display panel are fixed so as not to deviate from each other. Moreover, the stack is structured with a plurality of film layers aligned with high accuracy.

In the seventh aspect, both of the first and second polarizing plates affixed to the first display panel are absorptive polarizing plates, and therefore, the display device can display an image with high contrast.

In the eighth aspect, when the light source is off, the image display area of the first display panel serves as a mirror, and when the light source is on, the image display area serves as a highly designable mirror in which an image appears.

In the ninth aspect, as in the eighth aspect, when the light source is off, the image display area of the first display panel serves as a mirror, and when the light source is on, the image display area serves as a highly designable mirror in which an image appears. In this case, the display device according to the ninth aspect has a constant sum of the reflectance of the mirror and the transmittance for the source light, and therefore, even when the intensity of the source light is constant, if the transmittance of a pixel, i.e., the level of gray for image display, increases, the reflectance of the pixel decreases. As a result, the reflection of a view becomes less noticeable.

In the tenth aspect, the first and second polarizing plates cover not only the image display area of the first display panel but also the transparent display area. Thus, when ambient light incident from the back side is transmitted through the transparent display area, the observer on the front side is able to see the transparent display area displaying a background with levels of gray between the states of being transparent and black.

In the eleventh aspect, the display device functions as a display having the functions of both a see-through display and a mirror display. Moreover, in the case where the light source is off, in addition to the image display in the image display area, the liquid crystal display device is also capable of displaying a background in black and white in the transparent display area with levels of gray between the states of being transparent and a mirror.

In the twelfth aspect, when the light source is lit up to display an image in the image display area, the regularly arranged dot pattern is blurred by rendering the scattering area cloudy. Thus, when the image display area displays an image, the background displayed by ambient light incident from the back side is blurred and thereby rendered less visible, whereby the image in the image display area can be displayed clearly. In addition, by applying the above to the second aspect in which the light guiding plate with the dot pattern is used, it is rendered possible to inhibit the occurrence of a moire pattern caused by a dot pattern and a pixel pattern being overlaid on each other.

In the thirteenth aspect, the light-shielding plate, which is provided with the light-shielding area in the position that corresponds to the light-emitting area of the light guiding plate, is disposed behind the light guiding plate, whereby light escaping from the light guiding plate toward the back side can be reduced. As a result, the glare of the display device viewed by the observer on the back side is reduced. In addition, by forming the light-shielding area using a white or glossy material, it is rendered possible to reflect light escaping from the light guiding plate back to the light guiding plate, leading to an increased intensity of an image displayed in the image display area.

In the fourteenth aspect, the polarizing plate is disposed behind the light guiding plate, whereby the intensity of light escaping toward the back side can be halved almost without changing the transparency of the display device when viewed from the front side. Thus, the glare of the display device viewed from the back side can be reduced. Moreover, in the case where the polarizing plate is a reflective polarizing plate, the display device can be used as a one-way mirror which allows the front side of the display device to be less visible from the back side and also allows a background to seen from the front side with transparency equivalent to the transparency that can be achieved when no reflective polarizing plate is provided. Moreover, the reflective polarizing plate allows light emitted by the light guiding plate toward the back side to be reflected back to the front side, and therefore, contributes to increasing the intensity of an image viewed from the front side.

In the fifteenth aspect, the liquid crystal area of the second display panel disposed behind the light guiding plate is sandwiched between the two polarizing plates. Accordingly, depending on whether a voltage is applied, the second display panel can be switched between the state in which ambient light incident from the back side is transmitted toward the front side and the state in which both light from the light source escaping from the light guiding plate toward the back side and ambient light incident from the back side are blocked.

In the sixteenth aspect, the liquid crystal area of the second display panel functions as a shutter for switching between the states of being transparent and light-shielding in accordance with an applied voltage. By closing the shutter, light escaping from the light guiding plate can be prevented from being transmitted toward the back side. Thus, the glare of the display device viewed from the back side can be reduced. On the other hand, by opening the shutter, ambient light incident from the back side is transmitted from the back side to the front side, so that the background can be seen from the front side. Moreover, by using reflective polarizing plates as the polarizing plates to be affixed to the second display panel, the second display panel functions as an active reflective plate capable of switching between the states of being transparent and reflective while maintaining the shutter function. Accordingly, when the state is switched from transparent to reflective, light escaping from the light guiding plate toward the back side is reflected toward the liquid crystal panel by the reflective polarizing plates. Thus, light escaping from the light guiding plate toward the back side can be utilized efficiently. Moreover, the second display panel has no pattern overlying the pixel pattern of the first display panel. Thus, no moire pattern occurs.

In the seventeenth aspect, the display device includes the second display panel disposed behind the light guiding plate, so that the second display panel uses light escaping from the light guiding plate toward the back side as backlight to display the second image based on the externally provided second image information. Thus, the display device functions as a double-sided display in which the second display panel displays the second image different from the first image displayed on the first display panel.

In the eighteenth aspect, the two polarizing plates are disposed with the transmission axes parallel to each other, thereby realizing the transparent state in which the background side can be seen through the first and second display panels from the front side of the display device.

In the nineteenth aspect, the two polarizing plates are disposed with the transmission axes perpendicular to each other, so that the background side cannot be seen through the first and second display panels from the front side. Thus, both the first and second images displayed on the first and second display panels can be seen clearly.

MODES FOR CARRYING OUT THE INVENTION

1. First Embodiment

<1.1 Configuration of the Liquid Crystal Display Device>

Figure 1:
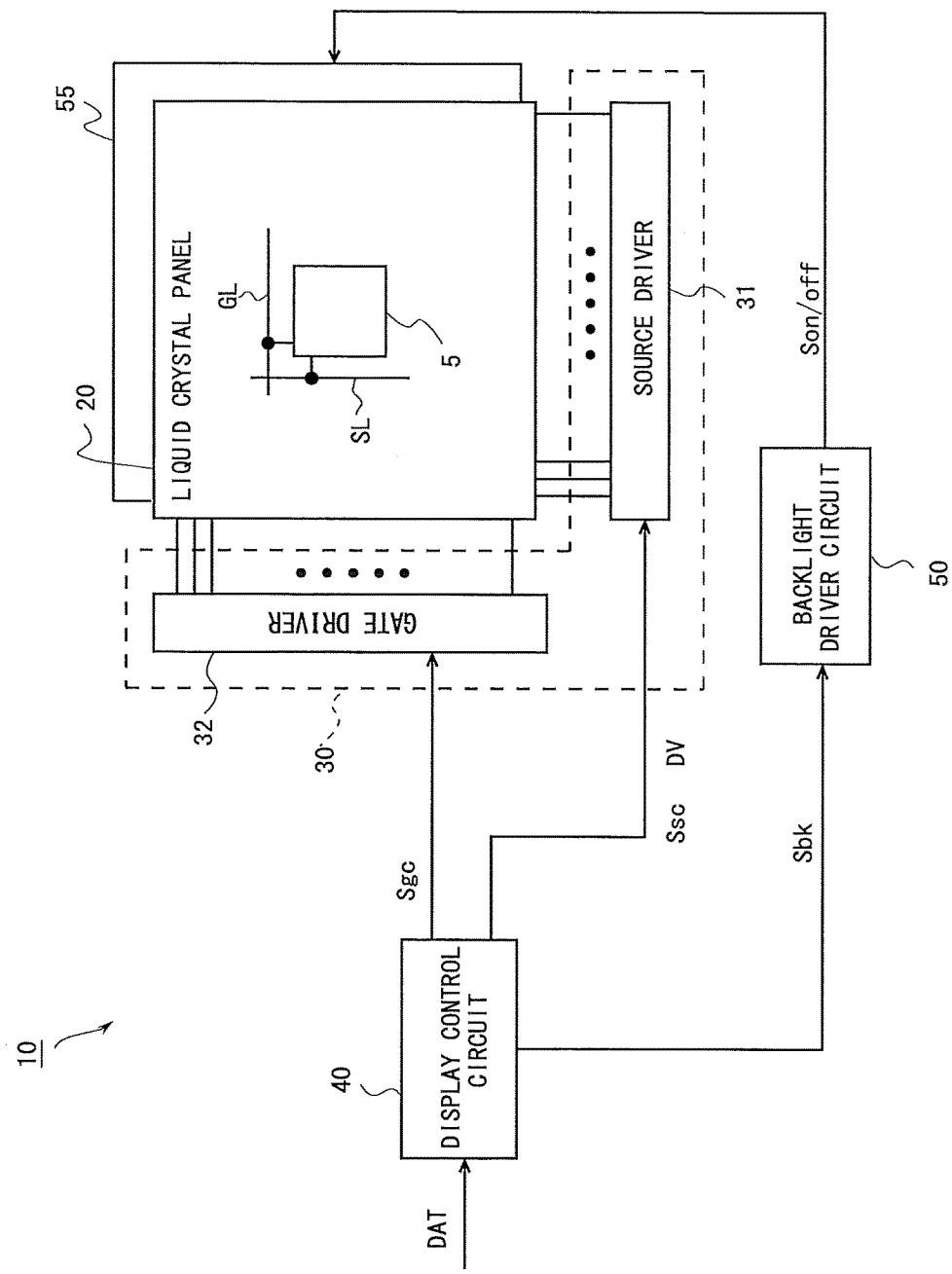
FIG. 1 is a block diagram illustrating the configuration of a liquid crystal display device according to a first embodiment.

FIG. 1 is a block diagram illustrating the configuration of a liquid crystal display device 10 according to a first embodiment of the present invention. The liquid crystal display device 10 includes a liquid crystal panel 20 (also referred to as a "first display panel"), a drive portion 30, a backlight unit 55 (also referred to as a "display light source"), a display control circuit 40, and a backlight driver circuit 50. In the following descriptions, the liquid crystal panel 20 and the backlight unit 55 will also be referred to collectively as the display portion 80.

The drive portion 30 includes a source driver 31 serving as a data signal line driver circuit and a gate driver 32 serving as a scanning signal line driver circuit. In the liquid crystal display device 10, when the display control circuit 40 is externally provided with image data DAT (also referred to as "first image information"), the display control circuit 40 internally generates a source driver control signal $S_{sc}$ for controlling the source driver 31 and a gate driver control signal $S_{gc}$ for controlling the gate driver 32, on the basis of the image data DAT. Note that the control signals $S_{sc}$ and $S_{gc}$ may be externally provided along with the image data DAT.

The liquid crystal panel 20 has an absorptive polarizing plate (not shown) affixed to each of the front and back surfaces. Moreover, the liquid crystal panel 20 has a plurality of data signal lines SL and a plurality of scanning signal lines GL formed thereon, and also has a pixel 5 disposed at each intersection of the data signal lines SL and the scanning signal lines GL. For convenience, FIG. 1 shows only one data signal line SL, one scanning signal line GL, and one pixel 5 disposed at the intersection thereof. Note that as will be described later, the liquid crystal panel 20 is divided into an image display area for image display and a transparent display area for background display, so that the liquid crystal panel 20 can display an image and a background at the same time.

Disposed on the back side of the liquid crystal panel 20 is a backlight unit 55. The backlight unit 55 includes a light guiding plate (not shown) and a light source (not shown) attached to an edge of the light guiding plate, and the light source includes three types of LEDs (light emitting diodes) respectively emitting red, green, and blue light. Each LED is driven by a drive signal Son/off provided by the backlight driver circuit 50, which is controlled by a control signal Sbk provided by the display control circuit 40. The light guiding plate emits backlight toward the liquid crystal panel 20 disposed on the front side, as will be described later. Note that unless specified otherwise, the liquid crystal display device 10 according to the present embodiment is a display device driven in a field-sequential mode, and the LEDs of the light source emit red, green, and blue light sequentially in a time division manner. In the case of the drive in a field-sequential mode, it is not necessary to form color filters on the pixels 5, and therefore, the light transmittance of the pixels 5 can be high.

When the display control circuit 40 is externally provided with image data DAT, which includes data representing an image (also referred to as a "first image") to be displayed in the image display area of the liquid crystal panel 20 and data indicating that the transparent display area is to be rendered transparent, the display control circuit 40 generates a source driver control signal $S_{sc}$ for controlling the source driver 31, a gate driver control signal $S_{gc}$ for controlling the gate driver 32, and digital image data DV, on the basis of the image data DAT. The source driver control signal $S_{sc}$ and the digital image data DV are provided to the source driver 31, and the gate driver control signal $S_{gc}$ is provided to the gate driver 32.

In accordance with the digital image data DV and the source driver control signal $S_{sc}$, the source driver 31 generates and applies a signal voltage to each data signal line SL. In accordance with the gate driver control signal $S_{gc}$, the gate driver 32 applies a scanning signal sequentially to each scanning signal line GL at a predetermined cycle, thereby activating the scanning signal line GL. As a result, the signal voltage applied to each data signal line SL is written to the pixels 5 connected to the active scanning signal line GL. In this manner, the liquid crystal panel 20 is driven so as to display an image corresponding to the digital image data DV on the pixels 5 in the image display area and render the pixels 5 in the transparent display area transparent so that a background is seen therethrough.

<1.2 Configuration of the Display Portion>

Figure 2:
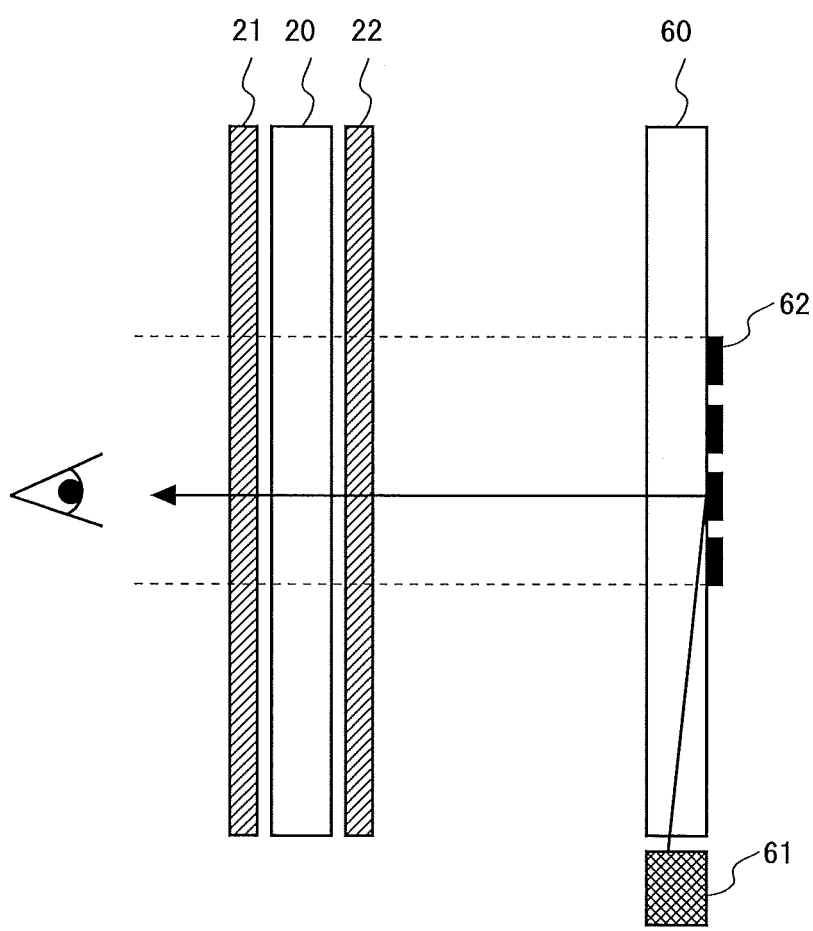
FIG. 2 is a diagram illustrating the configuration of a display portion of the liquid crystal display device according to the first embodiment.

FIG. 2 is a diagram illustrating the configuration of the display portion 80 of the liquid crystal display device 10 according to the present embodiment. As shown in FIG. 2, disposed in the display portion 80 are, sequentially from the front to the back side, the absorptive polarizing plate 21, the liquid crystal panel 20, the absorptive polarizing plate 22, and the light guiding plate 60. The absorptive polarizing plate 21 is affixed to the front surface of the liquid crystal panel 20, and the absorptive polarizing plate 22 is affixed to the back surface. The light guiding plate 60 has the light source 61, which consists of LEDs (not shown) for emitting red, green, and blue light, attached thereto along the edge.

Figure 3:
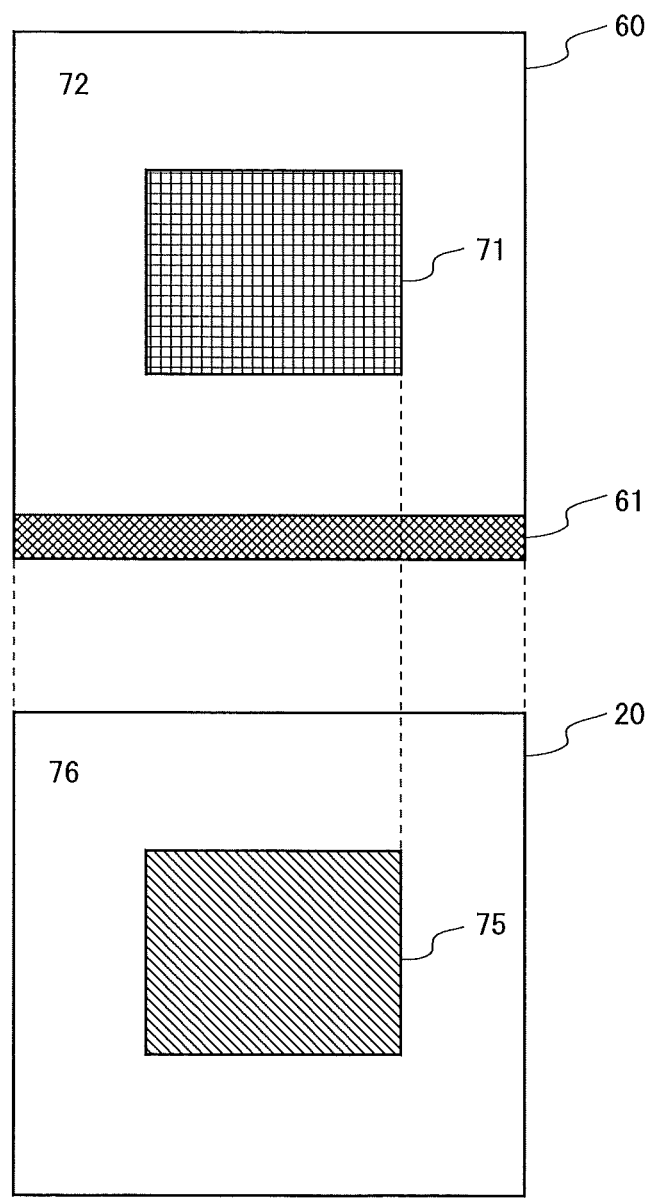
FIG. 3 is a plan view of a light guiding plate and a liquid crystal panel included in the liquid crystal display device according to the first embodiment.

FIG. 3 is a plan view of the light guiding plate 60 and the liquid crystal panel 20. As shown in FIG. 3, the liquid crystal panel 20 includes the image display area 75 for image display and the transparent display area 76 through which a background is seen. The image display area 75 is formed at the center of the liquid crystal panel 20, and the transparent display area 76 is formed so as to surround the image display area 75. The reason for the image display area 75 being formed at a distance from the edge of the liquid crystal panel 20 as described above is to render the liquid crystal panel 20 less susceptible to a phenomenon (bright-spot phenomenon) where the light guiding plate 60 emits light before light from the light source 61 spreads uniformly inside the light guiding plate 60, resulting in an eyeball-like pattern.

The light guiding plate 60 is a transparent plate made of, for example, acrylic, polycarbonate, or glass, with light-reflecting dots 62 formed by printing (i.e., dot printing) on the back surface of a light-emitting area 71 corresponding to the image display area 75. Moreover, the light guiding plate 60 has the light source 61 consisting of LEDs (not shown) attached thereto along the bottom edge. When the LEDs constituting the light source 61 are lit up sequentially, light emitted by the LEDs enters the light guiding plate 60 and spreads while being repeatedly subjected to total reflection by the front and back surfaces of the light guiding plate 60. At this time, light incident on the dots 62 is reflected or scattered toward the front side by the dots 62, and transmitted through the absorptive polarizing plate 22 to illuminate the image display area 75 of the liquid crystal panel 20. On the other hand, the drive portion 30 writes a signal voltage to each pixel 5 of the image display area 75, and therefore, when the light emitted by the light guiding plate 60 illuminates the image display area 75, the observer on the front side of the liquid crystal display device 10 is able to see a color image.

On the other hand, no dots are printed on a light-transmissive area 72 of the light guiding plate 60, which corresponds to the transparent display area 76. The LED light incident on the light guiding plate 60 does not exit the light guiding plate 60 from the light-transmissive area 72, and therefore, the transparent display area 76 of the liquid crystal panel 20 is not irradiated with light from the light guiding plate 60. Accordingly, the transparent display area 76 does not display a color image. However, ambient light from the back side is incident on the light-transmissive area 72 of the light guiding plate 60 and is transmitted through the light guiding plate 60 and further through the transparent display area 76 of the liquid crystal panel 20. Moreover, the absorptive polarizing plates 21 and 22 are affixed to the opposite surfaces of the transparent display area 76. Therefore, the observer on the front side of the liquid crystal display device 10 is able to see the background displayed with levels of gray between the states of being transparent and black in accordance with the signal voltage written to the pixels 5 in the transparent display area 76 of the liquid crystal panel 20. Note that as with the pixels 5 in the image display area 75, the pixels 5 in the transparent display area 76 have no color filters formed thereon and therefore have high transparency.

Furthermore, when the light source 61 is off, the light-emitting area 71 of the light guiding plate 60 emits no light toward the front side, and therefore, ambient light incident from the back side is transmitted through the light-emitting area 71 and illuminates the image display area 75 of the liquid crystal panel 20. Moreover, the absorptive polarizing plates 21 and 22 are affixed to the opposite surfaces of the image display area 75. Therefore, the observer on the front side is able to see the background displayed with levels of gray between the states of being transparent and black.

It should be noted that the dots 62 formed on the light-emitting area 71 of the light guiding plate 60 include, for example, dots which are formed of ink with the same refractive index as the light guiding plate 60 and reflect incident light at the interface between their surfaces and air, dots which are formed of ink mixed with a pigment and scatter incident light therein, and dots which are made of, for example, white or silver ink and reflect incident light at the interface with the light guiding plate 60. Any of the dots are formed on the light guiding plate 60 by a printing technique, such as inkjet printing or screen printing, using such ink. Accordingly, the light-emitting area 71 can be provided in a desired shape using a simple method such as printing. Moreover, by controlling, for example, dot coverage and density in the light-emitting area 71, it is possible to adjust the intensity and the intensity distribution of light emitted from the light-emitting area 71 or the transparency of the light-emitting area 71. Moreover, although dot printing has been described as being performed on the back surface of the light guiding plate 60, dot printing may be performed on the front surface of the light guiding plate 60. In this case, the distance is shortened for the propagation of the light reflected or scattered by the dots 62 occurring before incidence on the liquid crystal panel 20, resulting in a reduced deviation between the light-emitting area 71 of the light guiding plate 60 and the image display area 75 of the liquid crystal panel 20.

Furthermore, the drive mode of the liquid crystal panel 20 is not limited to the field-sequential mode and may be a color filter mode. In the color filter mode, the red, green, and blue LEDs are lit up simultaneously such that the light source 61 emits white light. Accordingly, in the color filter mode, each pixel 5 of the liquid crystal panel 20 consists of three subpixels on which red, green, and blue color filters are formed respectively. In this case, the color filters may be formed only on the pixels 5 in the image display area 75.

<1.3 Effects>

In the present embodiment, the dot-printed light-emitting area 71 of the light guiding plate 60 emits, as backlight, light whose intensity is so high that the intensity of ambient light can be negligible, and therefore, the observer on the front side of the liquid crystal display device 10 is able to see a clear image displayed in the image display area 75 of the liquid crystal panel 20. Moreover, ambient light is transmitted through the light-transmissive area 72 of the light guiding plate 60 to be incident on the transparent display area 76 of the liquid crystal panel 20, and therefore, the observer is able to see the background displayed with high transparency in the transparent display area 76. In this manner, the liquid crystal display device 10 functions as a see-through display achieving both high transparency and clear image display. In addition, the liquid crystal display device 10 is of a stand-alone type, and therefore, is not limited in terms of the location of installation.

The image display area 75 is provided at a distance from the edge of the liquid crystal panel 20, and therefore, the light-emitting area 71 corresponding thereto is also provided at a distance from the edge of the light guiding plate 60. Accordingly, light from the LEDs is homogenized within the light guiding plate 60 before illuminating the image display area 75. As a result, the bright-spot phenomenon becomes less likely to occur, resulting in enhanced image display quality. Moreover, the light-emitting area 71 can be provided in a desired shape using a simple method of printing a dot pattern on the back surface of the light guiding plate 60. Further, by controlling the dot coverage and density in the light-emitting area 71, it is possible to adjust the intensity and the intensity distribution of light emitted from the light-emitting area 71 or the transparency of the light-emitting area 71. Note that when the LEDs are off, ambient light incident from the back side is transmitted through the image display area 75, and therefore, the observer on the front side is also able to see the image display area 75 displaying the background with levels of gray between the states of being transparent and black.

<1.4 First Variant>

Figure 4:
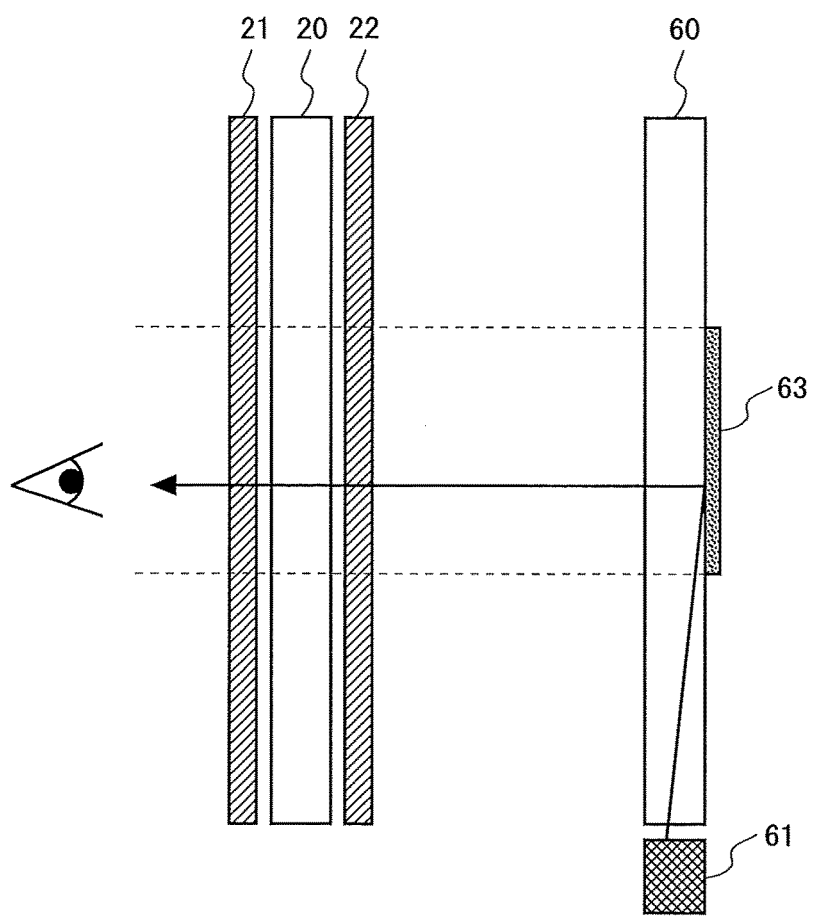
FIG. 4 is a diagram illustrating the configuration of a display portion of a liquid crystal display device according to a first variant of the first embodiment.

FIG. 4 is a diagram illustrating the configuration of a display portion 81 of a liquid crystal display device according to a first variant of the present embodiment. As shown in FIG. 4, the display portion 81 has a scattering film 63, which contains a light-scattering material, affixed to the light-emitting area 71 of the light guiding plate 60, in place of the printed dots. As the scattering property of the scattering film 63 becomes higher, light spreading while being repeatedly subjected to total reflection on the front and back surfaces of the light guiding plate 60 becomes more scattered by the scattering film 63 to illuminate the image display area 75 of the liquid crystal panel 20 from the light-emitting area 71. In this manner, as the amount of light scattered by the scattering film 63 increases, the amount of light incident on the image display area 75 also increases, resulting in an increased intensity of a displayed image.

It should be noted that if a large amount of light-scattering material is mixed in the film in order to enhance the scattering property, the amount of light illuminating the image display area 75 increases, resulting a high image intensity, but the scattering film 63 becomes cloudy due to the mixed light-scattering material. When the LEDs are powered off, the observer sees the image display area 75 from the front side through the cloudy scattering film 63, so that the background is seen with diminished transparency because of the cloudy scattering film 63. Therefore, given the use as a see-through display, the scattering film 63 preferably does not have an excessively high scattering property, and for example, it is preferable that the haze, an index representing the scattering property, of the scattering film 63 is 10% or less.

Affixing the scattering film 63 to the light-emitting area 71 in accordance with the present variant achieves the same effects as those achieved by printing a dot pattern. In addition, the scattering film 63 has very fine scattering particles randomly dispersed therein. Thus, there is no overlying pattern on the pixel pattern of the liquid crystal panel 20, so that a moire pattern is less likely to occur, whereby image display quality can be prevented from being reduced. Another effect is that the scattering film 63 is easy to handle upon affixing to the light guiding plate 60.

<1.5 Second Variant>

Figure 5:
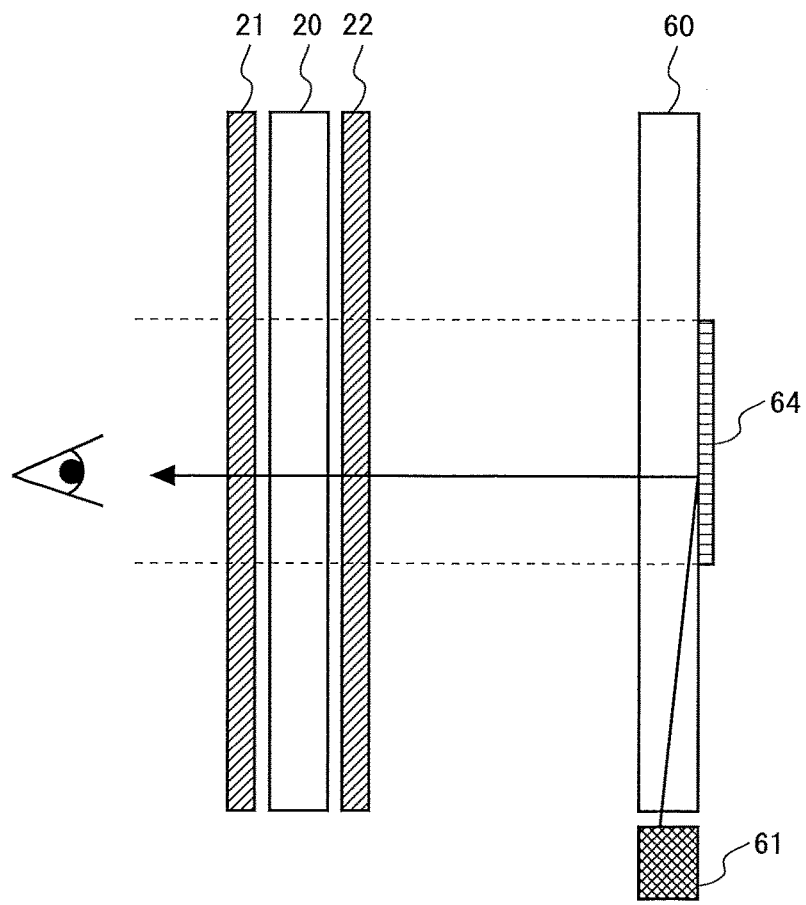
FIG. 5 is a diagram illustrating the configuration of a display portion of a liquid crystal display device according to a second variant of the first embodiment.

FIG. 5 is a diagram illustrating the configuration of a display portion 82 of a liquid crystal display device according to a second variant of the present embodiment. As shown in FIG. 5, the display portion 82 has a coating film 64 formed on the light-emitting area 71 of the light guiding plate 60 by applying a light-scattering material instead of printing dots. Such a coating film 64 is formed by dissolving scattering particles in, for example, an acrylic-based resin or an organic UV curing agent and applying the resultant product by spin coating.

In the case where the coating film 64 is formed, as in the case where the scattering film 63 is affixed, the higher the scattering property of the light-scattering material becomes, the more the light that spreads while being repeatedly subjected to total reflection within the light guiding plate 60 is scattered by the light-scattering material to illuminate the image display area 75 of the liquid crystal panel 20. In this manner, as the amount of light scattered by the light-scattering material increases, the amount of light incident on the image display area 75 also increases, resulting in an increased intensity of a displayed image.

It should be noted that in the case where the coating film 64 is formed, by increasing the amount of light-scattering material and thereby enhancing the scattering property, image intensity can be increased, as in the first variant, but the coating film 64 becomes cloudy. In this case, when the LEDs are powered off and the observer sees the image display area 75 from the front side, the background is seen through the cloudy coating film 64. As a result, the observer sees the background with diminished transparency. Accordingly, for the use as a see-through display, it is preferable that the haze of the coating film 64 is 10% or less, as in the case of the scattering film 63.

Forming the coating film 64 with the light-scattering material mixed therein in accordance with the present variant achieves the same effects as those achieved by printing a dot pattern. Moreover, the coating film 64 contains randomly dispersed scattering particles, thereby achieving the effect of rendering a moire pattern less likely to occur. In addition, when compared to the scattering film 63 affixed as shown in FIG. 4, the coating film 64 can be formed at a desired position with accuracy, and further, the coating film 64 has a strong adhesive power and therefore achieves the effect of being resistant to peeling off when the coating film adheres to the light guiding plate 60.

2. Second Embodiment

The configuration of a liquid crystal display device according to a second embodiment of the present invention is the same as the configuration of the liquid crystal display device 10 shown in FIG. 1, and therefore, any description thereof will be omitted.

<2.1 Configuration of the Display Portion>

Figure 6:
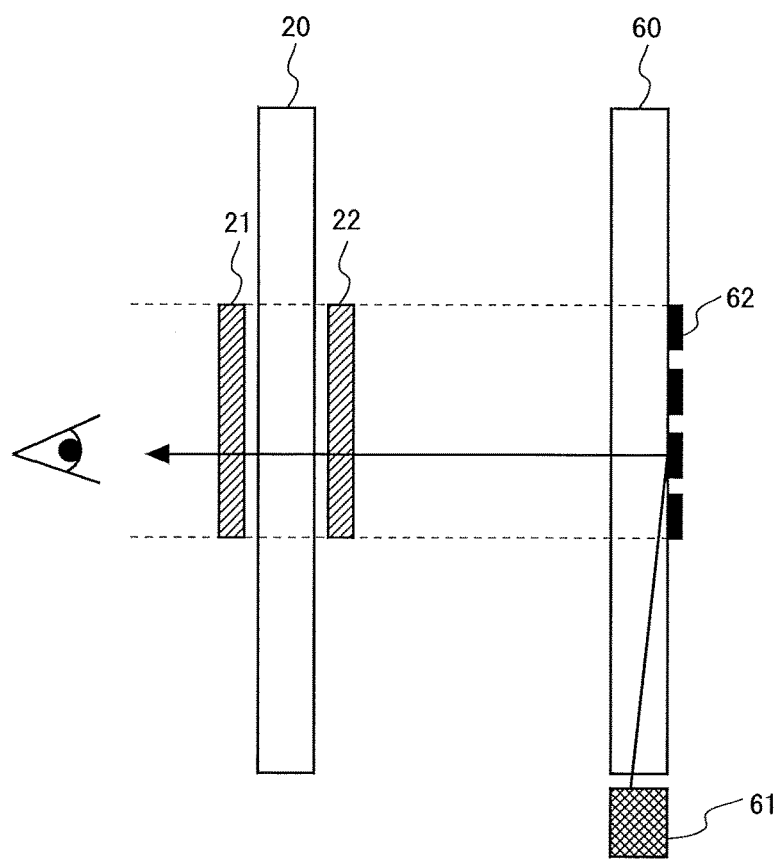
FIG. 6 is a diagram illustrating the configuration of a display portion of a liquid crystal display device according to a second embodiment.

FIG. 6 is a diagram illustrating the configuration of a display portion 83 of the liquid crystal display device according to the present embodiment. As shown in FIG. 6, disposed in the display portion 83 are, sequentially from the front to the back side of the liquid crystal display device, the absorptive polarizing plate 21, the liquid crystal panel 20, the absorptive polarizing plate 22, and the light guiding plate 60. The absorptive polarizing plates and 22 are affixed to the front and back surfaces, respectively, of the liquid crystal panel 20. The light guiding plate 60 has a light source 61, which consists of LEDs (not shown), attached thereto along the bottom edge. Moreover, the light guiding plate 60 has dots printed on the light-emitting area 71 in the same manner as in the case of the light guiding plate 60 shown in FIG. 2, and therefore, any description thereof will be omitted. Note that since the absorptive polarizing plates 21 and 22 are affixed to the liquid crystal panel 20 on the opposite surfaces of the image display area 75, the transmittance of the image display area 75 is at most 50%. Further, instead of printing the dots, the scattering film 63 may be affixed or the coating film 64 may be formed.

However, unlike in the display portion 80 shown in FIG. 2, the two absorptive polarizing plates 21 and 22 of the display portion 83 are the same size as the image display area 75 of the liquid crystal panel 20. In this case, the absorptive polarizing plates 21 and 22 are not affixed to the transparent display area 76 of the liquid crystal panel 20, and therefore, unlike in the first embodiment, the transparent display area 76 cannot display a background with levels of gray between the states of being transparent and black. However, the absorptive polarizing plates 21 and 22 are not affixed to the transparent display area 76, and therefore, the transmittance of the transparent display area 76 is as high as over 50%. Thus, the transparent display area 76 displays a background with high transparency.

No color filters are preferably formed on the pixels of the liquid crystal panel 20. Accordingly, the transparent display area 76 displays a background with higher transparency, and the image display area 75 displays a color image when driven in a field-sequential mode. Alternatively, color filters are affixed only to the pixels in the image display area 75, and only the pixels in the image display area 75 are driven in a color filter mode, so that the image display area 75 can display a color image.

Figure 7:
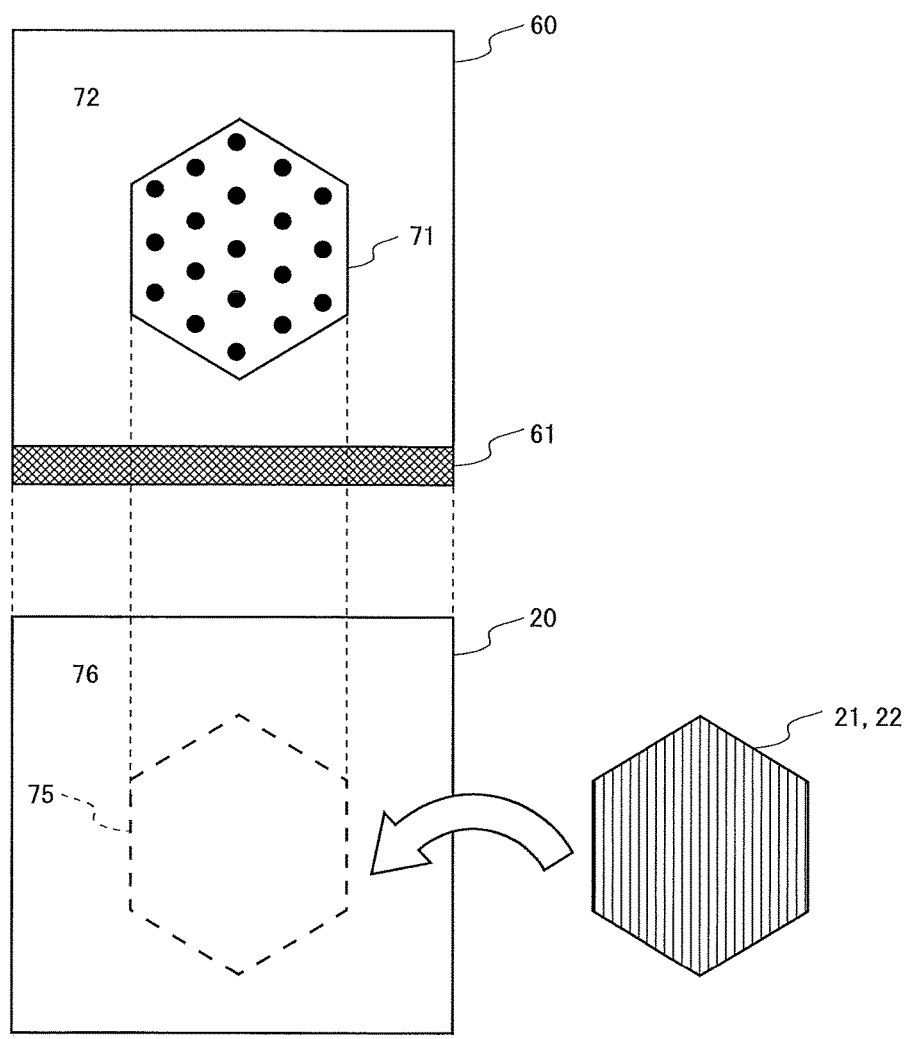
FIG. 7 is a plan view illustrating the configurations of a light guiding plate and a liquid crystal panel in the liquid crystal display device according to the second embodiment where a light-emitting area and an image display area are not rectangular.

Furthermore, the display device can be used as a see-through display for the following application. FIG. 7 is a plan view illustrating the configurations of the light guiding plate 60 and the liquid crystal panel 20 where the light-emitting area 71 and the image display area 75 are not rectangular. As shown in FIG. 7, the light-emitting area 71 is formed in a desired shape by printing a dot pattern on the light guiding plate 60 in the desired shape. Moreover, the absorptive polarizing plates 21 and 22 to be affixed to the liquid crystal panel 20 are also provided in the same shape as the printed dot pattern and affixed to the liquid crystal panel 20 in the position that corresponds to the light-emitting area. In this manner, the image display area 75 takes the desired shape and displays an image corresponding to that shape.

It should be noted that the liquid crystal display device according to the present embodiment may be driven in a color filter mode, rather than in a field-sequential mode, by forming color filters on the pixels in the image display area 75.

<2.2 Effects>

In the present embodiment, the image display area 75 of the liquid crystal panel 20 displays a clear image, as in the first embodiment, and the transparent display area 76 has no absorptive polarizing plates affixed thereto and therefore can display a background with higher transparency than in the first embodiment.

Furthermore, in the case where the light-emitting area 71 formed on the light guiding plate 60 by, for example, dot printing and the absorptive polarizing plates 21 and 22 affixed to the liquid crystal panel 20 are provided in the same shape, such a shape can be designed to be a desired shape. Thus, unlike in the case of non-rectangular displays recently introduced into the market, the liquid crystal panel 20 is not required to be designed exclusively, and the rectangular liquid crystal panel 20 displays an image in the image display area 75 provided in a desired shape.

<2.3 First Variant>

Figure 8:
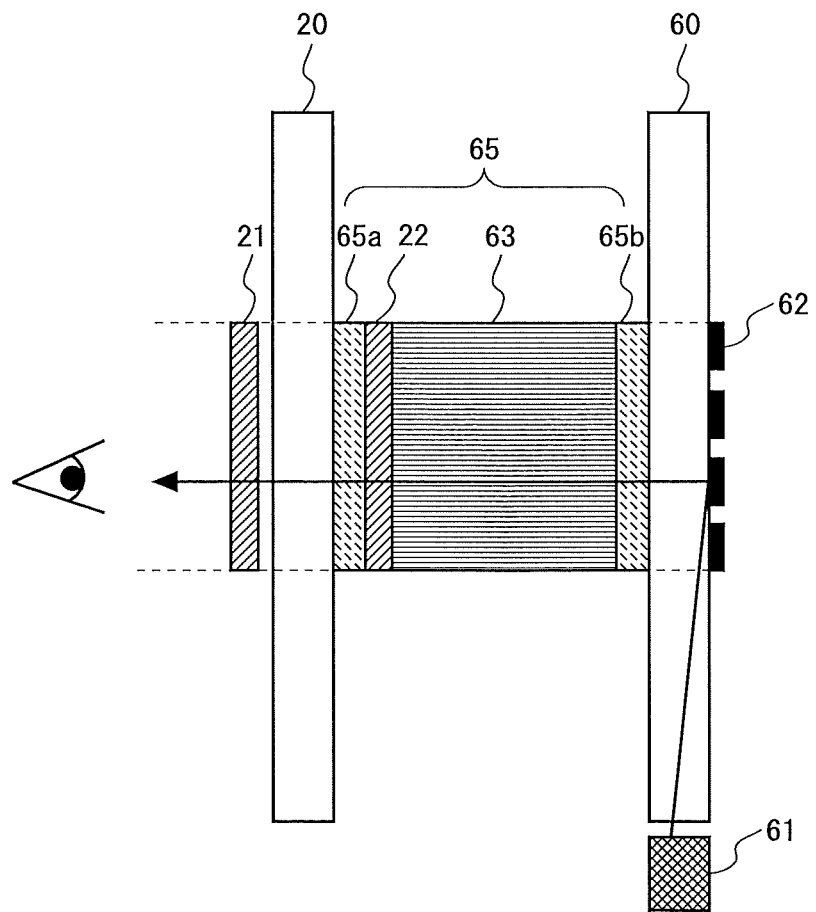
FIG. 8 is a diagram illustrating the configuration of a display portion of a liquid crystal display device according to a first variant of the second embodiment.

FIG. 8 is a diagram illustrating the configuration of a display portion 84 of a liquid crystal display device according to a first variant of the present embodiment. As shown in FIG. 8, the display portion 84 includes a stack 65 provided between the light-emitting area 71 of the light guiding plate 60 and the image display area 75 of the liquid crystal panel 20. The stack 65 includes, sequentially from the liquid crystal panel 20 to the light guiding plate 60, an adhesive layer 65a, an absorptive polarizing plate 22, a scattering film 63, and an adhesive layer 65b, and the stack 65 has the same size as each of the image display area 75 and the light-emitting area 71. The adhesive layer 65a of the stack 65 is affixed to the image display area 75 of the liquid crystal panel 20, and the adhesive layer 65b is affixed to the light-emitting area 71 of the light guiding plate 60. Accordingly, the absorptive polarizing plate 22 is disposed on the back side of the image display area 75, and the scattering film 63 is disposed on the front side of the light-emitting area 71. Note that the stack 65 is provided between the light guiding plate 60 and the liquid crystal panel 20 so as to function to keep the distance therebetween constant, and therefore, the stack 65 needs to be appropriately thick for such a function. Accordingly, in addition to the adhesive layer 65a, the absorptive polarizing plate 22, the scattering film 63, and the adhesive layer 65b, the stack 65 may further include a filling layer for infilling the gap between the light guiding plate 60 and the liquid crystal panel 20.

As in the case of the display portion 81 shown in FIG. 4, light emitted toward the front side by the light guiding plate 60 is transmitted through the scattering film 63 and the absorptive polarizing plate 22 in the stack 65 to illuminate the image display area 75 of the liquid crystal panel 20. Moreover, the image display area 75 of the liquid crystal panel 20 is sandwiched between the absorptive polarizing plates 21 and 22. Accordingly, as in the case of the display portion 80 shown in FIG. 2, when the light source 61 is on, the image display area 75 displays an image, and when the light source 61 is off, ambient light incident from the back side is transmitted through the image display area 75, whereby a background displayed with levels of gray can be seen through the image display area 75.

In the present variant, the stack 65, in which the absorptive polarizing plate 22 and the scattering film 63 are integrally formed, is sandwiched between the liquid crystal panel 20 and the light guiding plate 60, and further, the stack 65 is fixed to the image display area 75 of the liquid crystal panel 20 by the adhesive layer 65a and also to the light-emitting area 71 of the light guiding plate 60 by the adhesive layer 65b. Thus, in the liquid crystal display device according to the present variant, the light-emitting area 71 of the light guiding plate 60 and the image display area 75 of the liquid crystal panel 20 are inhibited from deviating from each other.

Furthermore, the stack 65 is structured by stacking a plurality of films, and the films can be stacked and aligned with high accuracy. In addition, by rendering the stack 65 thick, it is made possible to readily fix the stack 65 in a desired position between the light guiding plate 60 and the liquid crystal panel 20 simply by providing the stack 65 between the liquid crystal panel 20 and the light guiding plate 60 and pressing the light guiding plate 60 against the liquid crystal panel 20.

<2.4 Second Variant>

Figure 9:
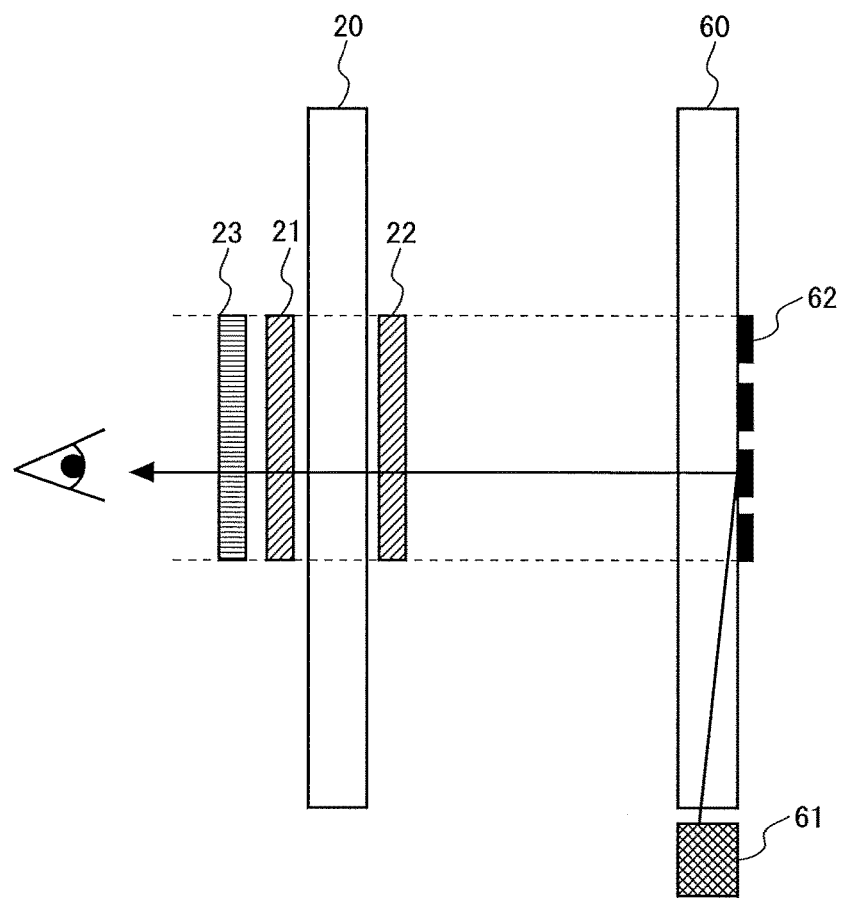
FIG. 9 is a diagram illustrating the configuration of a display portion of a liquid crystal display device according to a second variant of the second embodiment.

FIG. 9 is a diagram illustrating the configuration of a display portion 85 of a liquid crystal display device according to a second variant of the present embodiment.

When compared to the display portion 83 shown in FIG. 6, the display portion 85 additionally includes a reflective polarizing plate 23, which has the same size as the absorptive polarizing plate 21 and is affixed to the front surface of the absorptive polarizing plate 21, which is affixed to the front surface of the image display area 75 of the liquid crystal panel 20, as shown in FIG. 9. The reflective polarizing plate 23 is affixed with its transmission axis oriented in the same direction as the transmission axis of the absorptive polarizing plate 21.

The appearance of the image display area 75 of the display portion 85 as above will be described. When the light source 61 is off, the observer on the front side of the liquid crystal display device sees ambient light incident on the reflective polarizing plate 23 from the front side and reflected by the reflective polarizing plate 23. Accordingly, the liquid crystal display device serves as a mirror display. On the other hand, when the light source 61 is on, source light emitted by the light guiding plate 60 illuminates the image display area 75 of the liquid crystal panel 20 as backlight, and ambient light incident from the front side is reflected by the reflective polarizing plate 23. In this case, the observer on the front side of the liquid crystal display device sees a forward view from the front side of the display overlaid on an image displayed with levels of gray between the states of being black and transparent. Accordingly, the liquid crystal display device serves as a mirror display in which an image appears as in a mirror. Note that the light that is transmitted through the transparent display area 76 is the same as in the case shown in FIG. 6, and therefore, any description thereof will be omitted.

In this case, the absorptive polarizing plate 21 affixed to the front surface of the liquid crystal panel 20 is dispensable but still is preferably provided. The absorptive polarizing plate produces higher contrast than the reflective polarizing plate, and therefore, in the case where the absorptive polarizing plate 21 is provided, image display can be provided with higher display quality. Moreover, the stack 65 used in the first variant of the present embodiment may be used instead of using the absorptive polarizing plate 22 affixed to the back surface of the liquid crystal panel 20 and the dots printed on the light guiding plate 60.

Furthermore, in the case where the light source 61 is off, when the image display area 75 is rendered transparent, the observer on the front side of the liquid crystal display device sees both a forward view from the front side, which results from ambient light being incident from the front side and reflected by the reflective polarizing plate 23, and a background, which results from ambient light being incident on the light guiding plate 60 from the back side and transmitted through the light guiding plate 60 and the image display area 75. That is, the forward view from the front side is overlaid on the background that is seen through the image display area, and therefore, both the forward view from the front side and the background are not seen clearly. Accordingly, in the present variant, it is not preferable to render the image display area 75 transparent when the light source 61 is off.

In the present variant, when the light source 61 is off, the image display area 75 of the liquid crystal display device serves as a mirror, and when the light source 61 is on, the image display area 75 serves as a highly designable mirror in which an image appears. In this manner, the liquid crystal display device according to the present variant always functions as a mirror display, and is capable of displaying an image appearing as in a mirror when the light source 61 is on.

<2.5 Third Variant>

Figure 10:
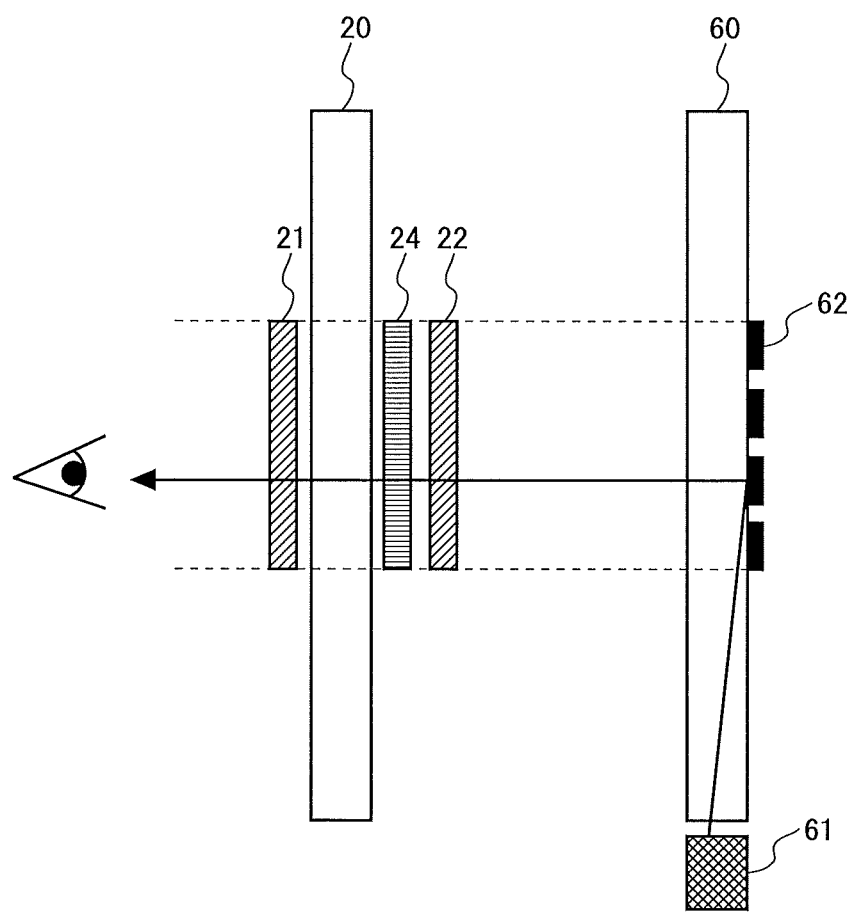
FIG. 10 is a diagram illustrating the configuration of a display portion of a liquid crystal display device according to a third variant of the second embodiment.

FIG. 10 is a diagram illustrating the configuration of a display portion 86 of a liquid crystal display device according to a third variant of the present embodiment. The display portion 86 shown in FIG. 10 includes a reflective polarizing plate 24 affixed to the back surface of the liquid crystal panel 20 of the display portion 83 shown in FIG. 6, and further, the absorptive polarizing plate is affixed to the front surface of the reflective polarizing plate 24. Here, the reflective polarizing plate 24 is affixed with its transmission axis oriented in the same direction as the transmission axis of the absorptive polarizing plate 22.

As in the case shown in FIG. 9, the liquid crystal display device of the present variant serves as a mirror display when the light source 61 is off. On the other hand, when the light source 61 is on, image display is provided with levels of gray between the states of being a mirror and transparent. Accordingly, the liquid crystal display device serves as a mirror display in which an image appears as in a mirror. In this case, image display is provided under the condition that achieves a constant sum of the reflectance for ambient light incident on the image display area 75 from the front side and reflected by the reflective polarizing plate 24 and the transmittance for backlight incident from the back side and transmitted through the image display area 75. In this manner, image display is provided under the condition that achieves a constant sum of the reflectance of the mirror and the transmittance for the backlight, and therefore, even when the intensity of the backlight is constant, if the transmittance of a pixel, i.e., the level of gray for image display, increases, the reflectance of the pixel decreases, so that the reflection of a view becomes less noticeable. As a result, the liquid crystal display device of the present variant functions as a display which prioritizes image display rather than the mirror function, so that image display can be provided more clearly. Note that the reason why the mirror display function is provided when the light source 61 is off, as described above, is that the absorptive polarizing plates 21 and 22 are disposed such that the liquid crystal panel 20 operates in normally black mode. Therefore, by disposing the absorptive polarizing plates 21 and 22 such that the liquid crystal panel 20 operates in normally white mode, the display is rendered transparent when the light source 61 is off.

It should be noted that the absorptive polarizing plate 22 affixed to the back surface of the liquid crystal panel 20 is dispensable, but as in the case of the second variant, image display can be provided with higher display quality when the absorptive polarizing plate 22 is provided.

Furthermore, the stack 65 as used in the first variant may be used instead of using the absorptive polarizing plate 22 affixed to the back surface of the liquid crystal panel 20 and the dots printed on the light guiding plate 60. In this case, the adhesive layer 65a of the stack 65 is affixed to the front surface of the reflective polarizing plate 24. Moreover, in the display portion 86 of the present variant, the mirror function is realized by affixing the reflective polarizing plate 24 to the back surface of the absorptive polarizing plate 22, and therefore, ambient light incident from the front side is transmitted through the liquid crystal panel 20 twice. Accordingly, to increase the transmittance of the liquid crystal panel 20 for ambient light, it is preferable that the liquid crystal panel 20 has no color filters formed on the pixels.

In the present variant, as in the second variant shown in FIG. 9, when the light source 61 is off, the image display area 75 of the liquid crystal display device serves as a mirror, and when the light source 61 is on, the image display area 75 serves as a highly designable mirror in which an image appears. In addition, the liquid crystal display device according to the present variant functions as a display which prioritizes image display more than is prioritized in the second variant.

3. Third Embodiment

The configuration of a liquid crystal display device according to a third embodiment of the present invention is the same as the configuration of the liquid crystal display device 10 shown in FIG. 1, and therefore, any description thereof will be omitted.

<3.1 Configuration of the Display Portion>

Figure 11:
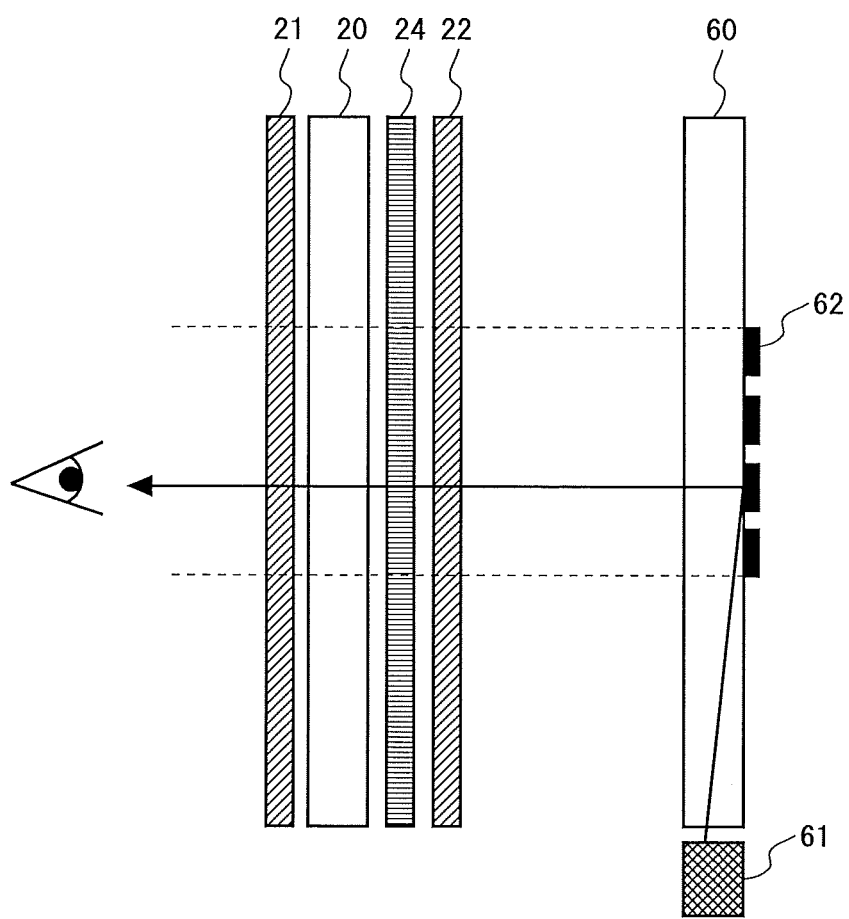
FIG. 11 is a diagram illustrating the configuration of a display portion of a liquid crystal display device according to a third embodiment.

FIG. 11 is a diagram illustrating the configuration of a display portion 87 of the liquid crystal display device according to the present embodiment. The display portion 87 shown in FIG. 11 is structured such that a reflective polarizing plate 24, the same size as the liquid crystal panel 20 of the display portion 80 shown in FIG. 2, is affixed to the back surface of the liquid crystal panel 20, and further, the absorptive polarizing plate 22 is affixed to the front surface of the reflective polarizing plate 24. From another perspective, it can be said that the reflective polarizing plate 24 and the two absorptive polarizing plates 21 and 22 in the configuration shown in FIG. 10 are provided in the same size as the liquid crystal panel 20.

The appearance of the image display area 75 of the display portion 87 as above will be described. When the light source 61 is on, light from the light source 61 is emitted as backlight from the light-emitting area 71 of the light guiding plate 60 toward the liquid crystal panel 20. The backlight emitted by the light guiding plate 60 is transmitted sequentially through the absorptive polarizing plate 22, the reflective polarizing plate 24, the liquid crystal panel 20, and the absorptive polarizing plate 21, so that the image display area 75 displays a color image. Moreover, ambient light incident on the absorptive polarizing plate 21 from the front side is transmitted through the liquid crystal panel 20 and reflected by the reflective polarizing plate 24 toward the front side, so that the image display area 75 also serves as a mirror. Thus, the observer on the front side of the liquid crystal display device sees the color image displayed in a mirror with levels of gray between the states of being black and a mirror.

On the other hand, when the light source 61 is off, a half of the ambient light incident from the back side is absorbed by the absorptive polarizing plate 22, and the other half is transmitted sequentially through the reflective polarizing plate 24, the liquid crystal panel 20, and the absorptive polarizing plate 21. In this manner, when the light source 61 is off, the ambient light incident from the back side is in part transmitted through the liquid crystal panel 20. In addition, ambient light incident on the absorptive polarizing plate 21 from the front side is transmitted through the liquid crystal panel 20 and reflected by the reflective polarizing plate 24 toward the front side.

Thus, the observer sees a background displayed in black and white with levels of gray between the states of being transparent and a mirror.

Next, the transparent display area 76 of the liquid crystal panel 20 will be described. Regardless of whether the light source 61 is on, light from the light source 61 is not emitted from the light-transmissive area 72 of the light guiding plate 60 and therefore does not illuminate the transparent display area 76 of the liquid crystal panel 20. Accordingly, ambient light transmitted through the light guiding plate 60 from the back side is incident on the transparent display area 76 of the liquid crystal panel 20, and ambient light from the front side is also incident on the transparent display area 76. Moreover, the transparent display area 76 of the liquid crystal panel 20 is sandwiched between the two absorptive polarizing plates 21 and 22. Accordingly, the observer sees the transparent display area 76 displaying a background in black and white with levels of gray between the states of being transparent and a mirror, as seen in the image display area 75 when the light source 61 is off. In this manner, the liquid crystal display device of the present embodiment displays a background with levels of gray in a different manner from the liquid crystal display device according to the first embodiment in that the state of being a mirror is involved instead of the state of being black.

It should be noted that the absorptive polarizing plate 22 affixed to the back surface of the liquid crystal panel 20 is dispensable but still is preferably provided. The absorptive polarizing plate produces higher contrast than the reflective polarizing plate, and therefore, in the case where the absorptive polarizing plate 22 is provided, image display can be provided with higher display quality.

<3.2 Effect>

In the present embodiment, the liquid crystal display device functions as a display with the functions of both a see-through display and a mirror display, and is capable of displaying a color image in a mirror with levels of gray between the states of being black and a mirror. Furthermore, in the case where the light source 61 is off, in addition to the image display in the image display area 75, the liquid crystal display device is also capable of displaying a background in black and white in the transparent display area 76 with levels of gray between the states of being transparent and a mirror.

4. Fourth Embodiment

Figure 12:
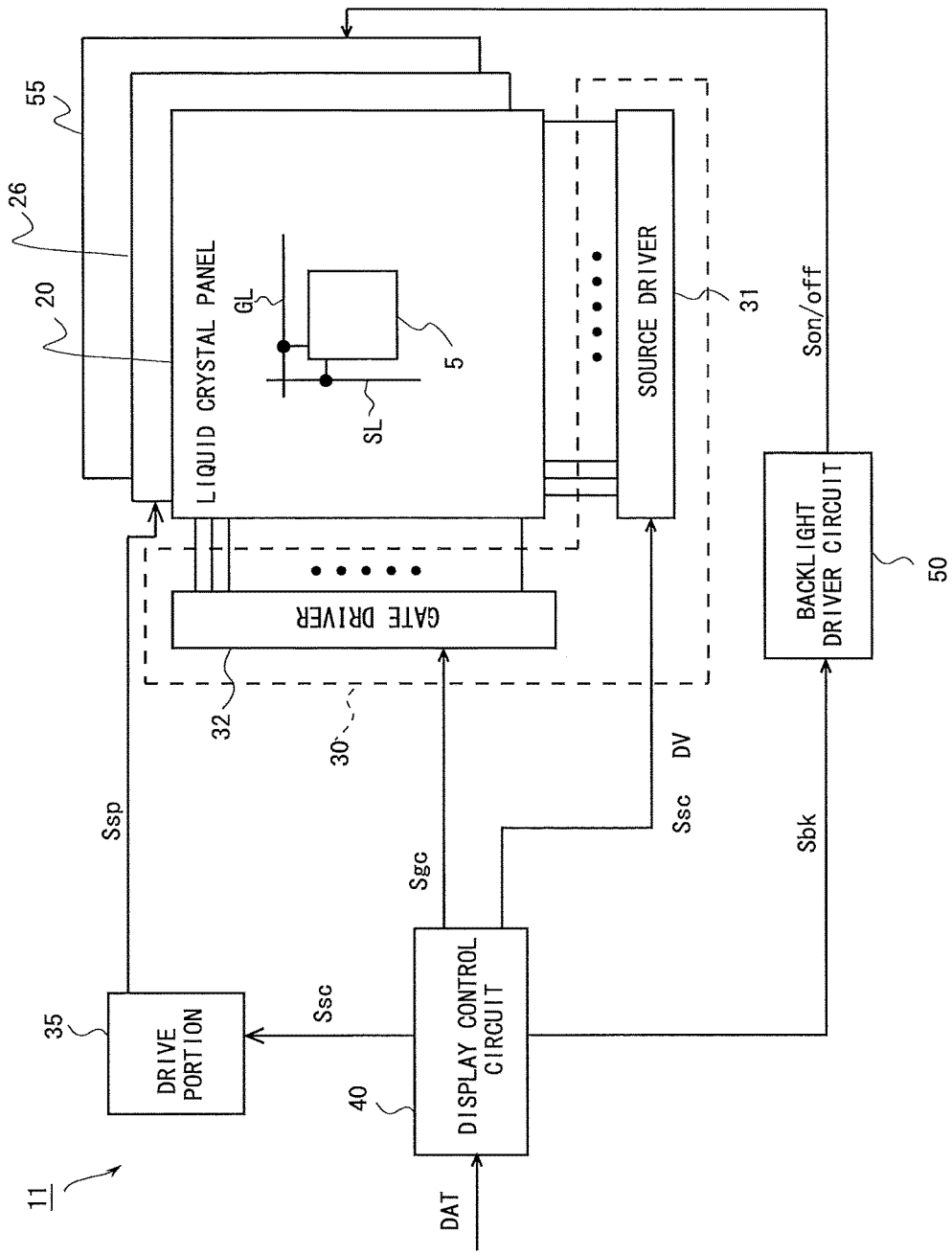
FIG. 12 is a block diagram illustrating the configuration of a liquid crystal display device according to a fourth embodiment.

FIG. 12 is a block diagram illustrating the configuration of a liquid crystal display device 11 according to a fourth embodiment of the present invention. The liquid crystal display device 11 includes a scattering liquid crystal panel 26 disposed in the space between the liquid crystal panel 20 and the light guiding plate 60 of the liquid crystal display device 10 shown in FIG. 1. Moreover, there is provided a drive portion (also referred to as a "second drive portion") 35 for driving the scattering liquid crystal panel 26. The drive portion 35 generates a drive signal $S_{sp}$ in accordance with a control signal $S_{sc}$ provided by the display control circuit 40, and drives the scattering liquid crystal panel 26 by means of the drive signal $S_{sp}$. Other components included in the liquid crystal display device 11 are the same as the components of the liquid crystal display device 10 shown in FIG. 1 and therefore denoted by the same reference characters, and any descriptions thereof will be omitted.

<4.1 Configuration of the Display Portion>

Figure 13:
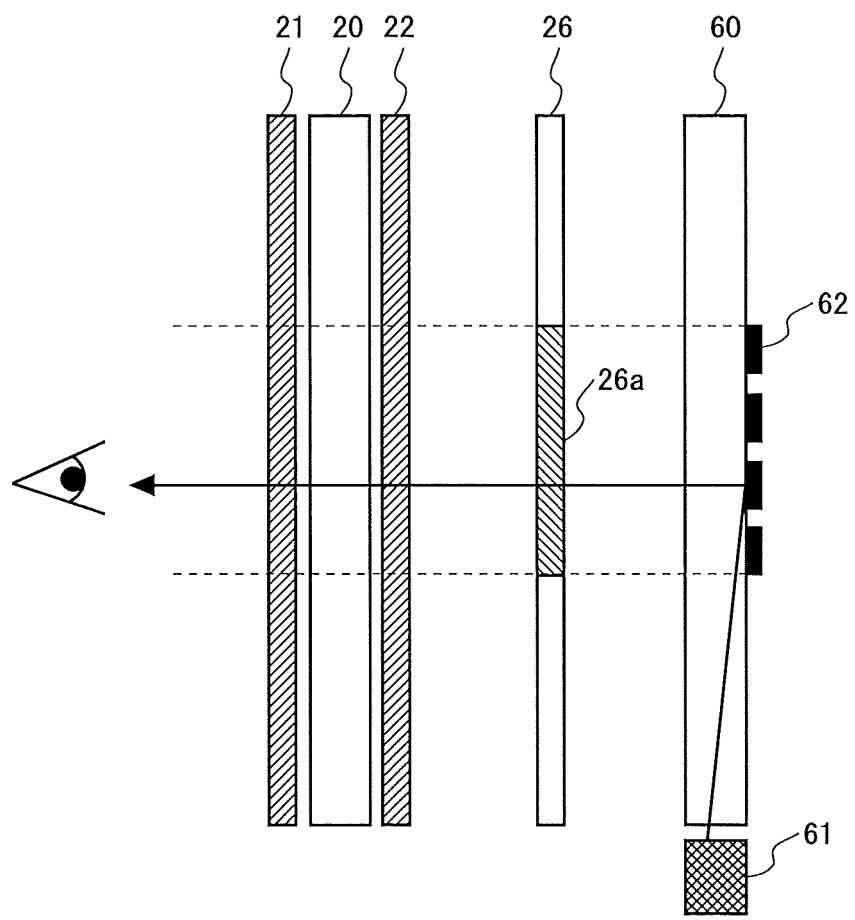
FIG. 13 is a diagram illustrating the configuration of a display portion of the liquid crystal display device according to the fourth embodiment.

FIG. 13 is a diagram illustrating the configuration of a display portion 88 of the liquid crystal display device according to the present embodiment. In the case of the display portion 80 shown in FIG. 2, image display is provided in the image display area 75 simply by lighting up the light-emitting area 71 of the light guiding plate 60. However, when the background is bright, the background is seen through the image display area 75, and therefore, an image desired to be displayed might become less visible. Moreover, in the case where the dot pattern formed by dot printing is a regular pattern, a moire pattern appears by the dot pattern overlying the pixel pattern formed on the liquid crystal panel 20 because the pixel pattern is also a regular pattern.

To solve these problems with the display portion 80, scattering liquid crystals are utilized. The scattering liquid crystals include PDLC (polymer dispersed liquid crystals), PNLC (polymer network liquid crystals), and the like, and have characteristics of being cloudy and opaque when no voltage is applied but becoming transparent when a voltage is applied. Accordingly, the scattering liquid crystal panel 26, which takes advantage of the characteristics of the scattering liquid crystals, is disposed in the display portion 88 of the present embodiment.

The display portion 88 shown in FIG. 13 includes the scattering liquid crystal panel 26, which has a scattering area 26a injected with scattering liquid crystals and is disposed between the image display area 75 of the liquid crystal panel 20 and the light-emitting area 71 of the light guiding plate 60 in the display portion 80 shown in FIG. 2. The scattering area 26a is formed in the scattering liquid crystal panel 26 in the position that corresponds to the light-emitting area 71 and the image display area.

In the case of the display portion 88 as above, when the light source 61 is lit up to display an image in the image display area 75 but no voltage is applied to the scattering area 26a, the scattering area 26a is cloudy. Accordingly, when light derived from the light source 61 and reflected by the dots 62 of the light guiding plate 60 is transmitted through the scattering area 26a, the dots 62 appear blurry and therefore become less noticeable. Moreover, ambient light incident on the image display area from the back side is also transmitted through the scattering area 26a, so that the background appears blurry and therefore becomes less noticeable. Thus, an image desired to be displayed can be seen clearly, and also the occurrence of a moire pattern is inhibited.

On the other hand, when the light source 61 is turned off to allow ambient light incident from the background side to be transmitted through to the image display area 75, a voltage is applied to the scattering area 26a. As a result, the scattering area 26a becomes transparent, the background can be seen clearly from the front side of the liquid crystal display device. In this manner, by using the scattering liquid crystal panel 26 rather than a regular light-scattering material, it is made possible to perform dynamic control to render the scattering area 26a cloudy or transparent. Note that the scattering area 26a is not formed in the transparent display area 76 of the liquid crystal panel 20, and therefore, the background can be seen through the transparent display area, as in the first embodiment.

Furthermore, instead of disposing the scattering liquid crystal panel 26 with the scattering area 26a provided as a part thereof, a scattering liquid crystal panel 26 serving in its entirety as a scattering area 26a may be disposed. In this case, the area of the scattering liquid crystal panel 26 that corresponds to the light-emitting area 71 of the light guiding plate 60 may be kept cloudy by applying no voltage to that area, and the rest of the scattering liquid crystal panel 26 that corresponds to the light-transmissive area 72 may be rendered transparent by applying a voltage. In addition, the transparent area and the cloudy area may be formed in the scattering area 26a by forming pixels in the scattering liquid crystal panel 26 so as to correspond to the pixels of the liquid crystal panel 20 and controlling whether to apply a voltage on a pixel by pixel basis.

It should be noted that providing the scattering liquid crystal panel 26 between the liquid crystal panel 20 and the light guiding plate 60, as in the present embodiment, can be applied to the display portions in the first embodiment, the first and second variants thereof, the second embodiment, the second variant thereof, and the third embodiment, thereby achieving similar effects to those achieved by the present embodiment.

<4.2 Effects>

In the present embodiment, when the image display area 75 displays an image, the background displayed by ambient light incident from the back side is blurred and thereby rendered less noticeable. Accordingly, the liquid crystal display device can clearly display an image in the image display area 75. In addition, when the light source 61 is lit up to display an image in the image display area 75, it is rendered possible to blur the regularly arranged dot pattern by rendering the scattering area 26a cloudy. Thus, the liquid crystal display device renders it possible to inhibit the occurrence of a moire pattern caused by a dot pattern and a pixel pattern being overlaid on each other.

5. Fifth Embodiment

The configuration of a liquid crystal display device according to a fifth embodiment of the present invention is the same as the configuration of the liquid crystal display device 10 shown in FIG. 1, and therefore, any description thereof will be omitted.

<5.1 Configuration of the Display Portion>

Figure 14:
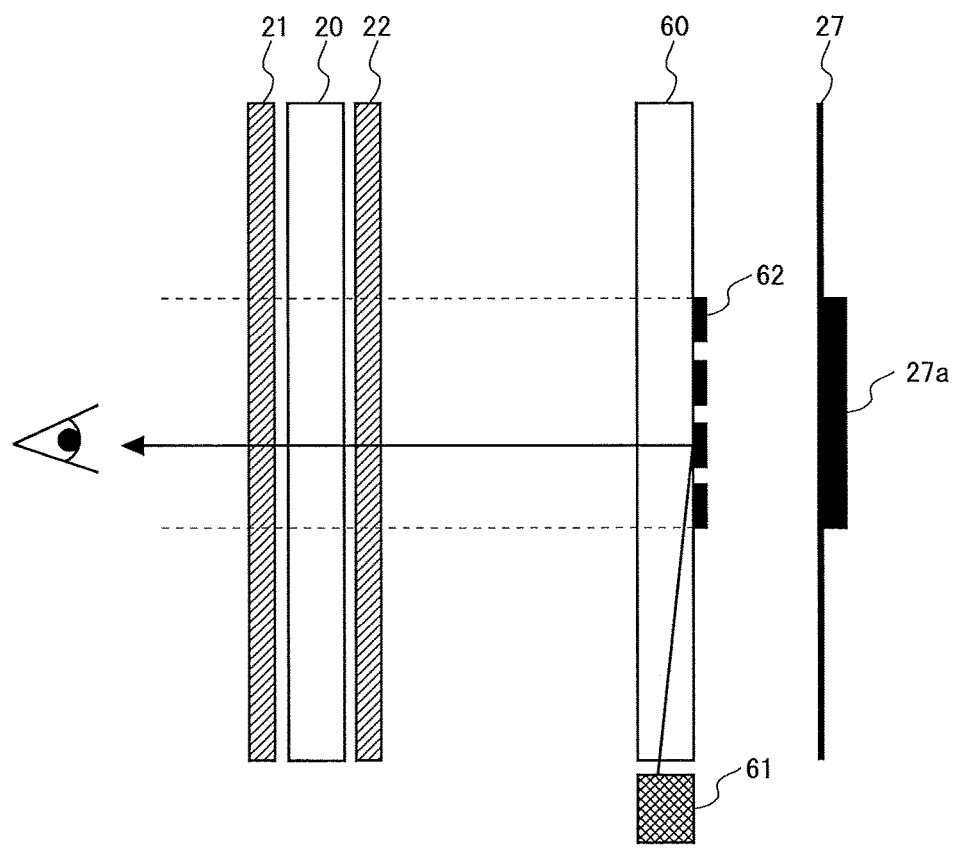
FIG. 14 is a diagram illustrating the configuration of a display portion of a liquid crystal display device according to a fifth embodiment.

FIG. 14 is a diagram illustrating the configuration of a display portion 89 of the liquid crystal display device according to the present embodiment. In the case of the display portion 80 shown in FIG. 2, when light from the light source 61 is incident on the light guiding plate 60, the incident light spreads while being repeatedly subjected to total reflection inside the light guiding plate 60, and exits from the light-emitting area 71 toward the front side but some light escapes toward the back side. As a result, when the observer on the back side of the display portion 80 sees the liquid crystal display device, the observer might experience glaring light escaping from the light guiding plate 60, resulting in a problem depending on the purpose of use.

Accordingly, in the present embodiment, disposed behind the light guiding plate 60 is a light-shielding plate 27 for blocking light escaping from the light guiding plate 60, as shown in FIG. 14. The light-shielding plate 27 is provided with a light-shielding area 27a formed of a blackout material in a position corresponding to the light-emitting area 71 of the light guiding plate 60. The light-shielding area 27a is formed by applying a black light-absorbing material, a white or glossy light-reflecting material, or the like, to a transparent substrate, such as an acrylic plate, by coating the substrate with such a material, or by affixing a film of such a material to the substrate. In particular, such a white or glossy material reflects light escaping from the light guiding plate 60 back to the light guiding plate 60, so that the intensity of backlight increases, resulting in a high intensity of an image displayed in the image display area 75.

It should be noted that almost no light from the light source 61 escapes from the light-transmissive area 72 of the light guiding plate 60, and therefore, the light-shielding area 27a is not provided so as to cover the area of the light-shielding plate 27 that corresponds to the light-transmissive area 72.

Furthermore, providing the light-shielding plate 27 behind the light guiding plate 60, as in the present embodiment, can be applied to the display portions in the first embodiment, the first and second variants thereof, the second embodiment, the first and second variants thereof, and the third embodiment, thereby achieving similar effects to those achieved by the present embodiment.

<5.2 Effects>

In the present embodiment, the light-shielding plate 27, which is provided with the light-shielding area 27a in the position that corresponds to the light-emitting area 71 of the light guiding plate 60, is disposed behind the light guiding plate 60, so that light escaping from the light guiding plate 60 toward the back side can be reduced. As a result, the glare of the liquid crystal display device viewed by the observer on the back side is reduced. In addition, by forming the light-shielding area 27a using a white or glossy material, it is rendered possible to reflect light escaping from the light guiding plate 60 back to the light guiding plate 60, so that the reflected light is incorporated in backlight, resulting in an increased intensity of an image displayed on the image display area 75.

<5.3 Variants>

Figure 15:
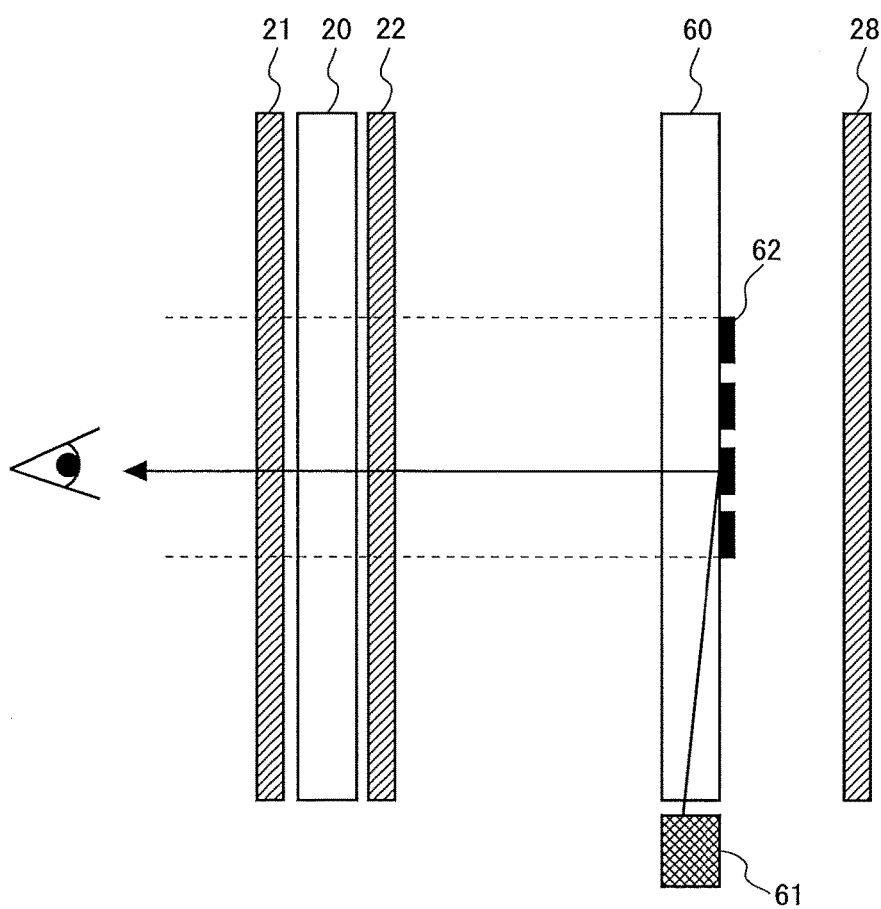
FIG. 15 is a diagram illustrating the configuration of a display portion of a liquid crystal display device according to a variant of the fifth embodiment.

FIG. 15 is a diagram illustrating the configuration of a display portion 90 of a liquid crystal display device according to a variant of the present embodiment. As shown in FIG. 15, the display portion 90 additionally includes an absorptive polarizing plate 28 disposed behind the light guiding plate 60. The absorptive polarizing plate 28 is affixed with its transmission axis oriented in the same direction as the transmission axis of the absorptive polarizing plate 22 affixed to the back surface of the liquid crystal panel 20. Accordingly, when the liquid crystal display device is viewed from the front toward the back side, the background is seen therethrough with almost the same transparency as in the case where no absorptive polarizing plate 28 is disposed behind the light guiding plate 60. In this manner, the presence of the absorptive polarizing plate 28 does not change the transparency seen from the front side.

On the other hand, light emitted by the light guiding plate 60 is non-polarized light, and therefore, when the light is transmitted through the absorptive polarizing plate 28, only the light whose polarization is oriented in the same direction as the transmission axis of the absorptive polarizing plates is transmitted through the polarizing plates. As a result, in the light escaping from the light guiding plate 60, the proportion of light further transmitted through the absorptive polarizing plate 28 is halved. Thus, the glare of the liquid crystal display device viewed by the observer on the back side of the liquid crystal display device is reduced.

It should be noted that instead of disposing the absorptive polarizing plate 28 behind the light guiding plate 60, a reflective polarizing plate may be disposed. In the case where any reflective polarizing plate is disposed, the reflective polarizing plate is affixed with its reflection axis oriented in the same direction as the absorption axis of the absorptive polarizing plate 22 affixed to the back surface of the liquid crystal panel 20. Therefore, even when light escaping from the light guiding plate 60 toward the back side is reflected back to the light guiding plate 60 by the reflective polarizing plate, the reflected light is absorbed by the absorptive polarizing plate 22, so that there is almost no effect of increasing the intensity of an image displayed in the image display area 75. However, when the reflective polarizing plate is viewed from the back side of the liquid crystal display device, the front side of the liquid crystal display device is less visible from the back side because of light escaping from the light guiding plate 60 and transmitted through the reflective polarizing plate as well as ambient light incident on the reflective polarizing plate from the back side and reflected by the reflective polarizing plate. In this manner, by disposing the reflective polarizing plate behind the light guiding plate 60, the back side of the liquid crystal display device can be viewed from the front side, as in the case where no reflective polarizing plate is provided, but in contrast, the front side becomes less visible from the back side. Therefore, such a liquid crystal display device can be used as a one-way mirror.

Furthermore, providing the absorptive polarizing plate 28 or the reflective polarizing plate behind the light guiding plate 60, as in the present embodiment, can be applied to the display portions in the first embodiment, the first and second variants thereof, the second embodiment, the first and second variants thereof, and the third embodiment, thereby achieving similar effects to those achieved by the present embodiment.

In the present variant, similar effects to those achieved by the first embodiment can be achieved by disposing the absorptive polarizing plate 28 or the reflective polarizing plate behind the light guiding plate 60. Moreover, the intensity of light escaping toward the back side can be halved almost without changing the transparency of the liquid crystal display device when viewed from the front side. Thus, the glare of the liquid crystal display device viewed from the back side can be reduced. Moreover, in the case where the reflective polarizing plate is disposed behind the light guiding plate 60, the liquid crystal display device can be used as a one-way mirror.

6. Sixth Embodiment

Figure 16:
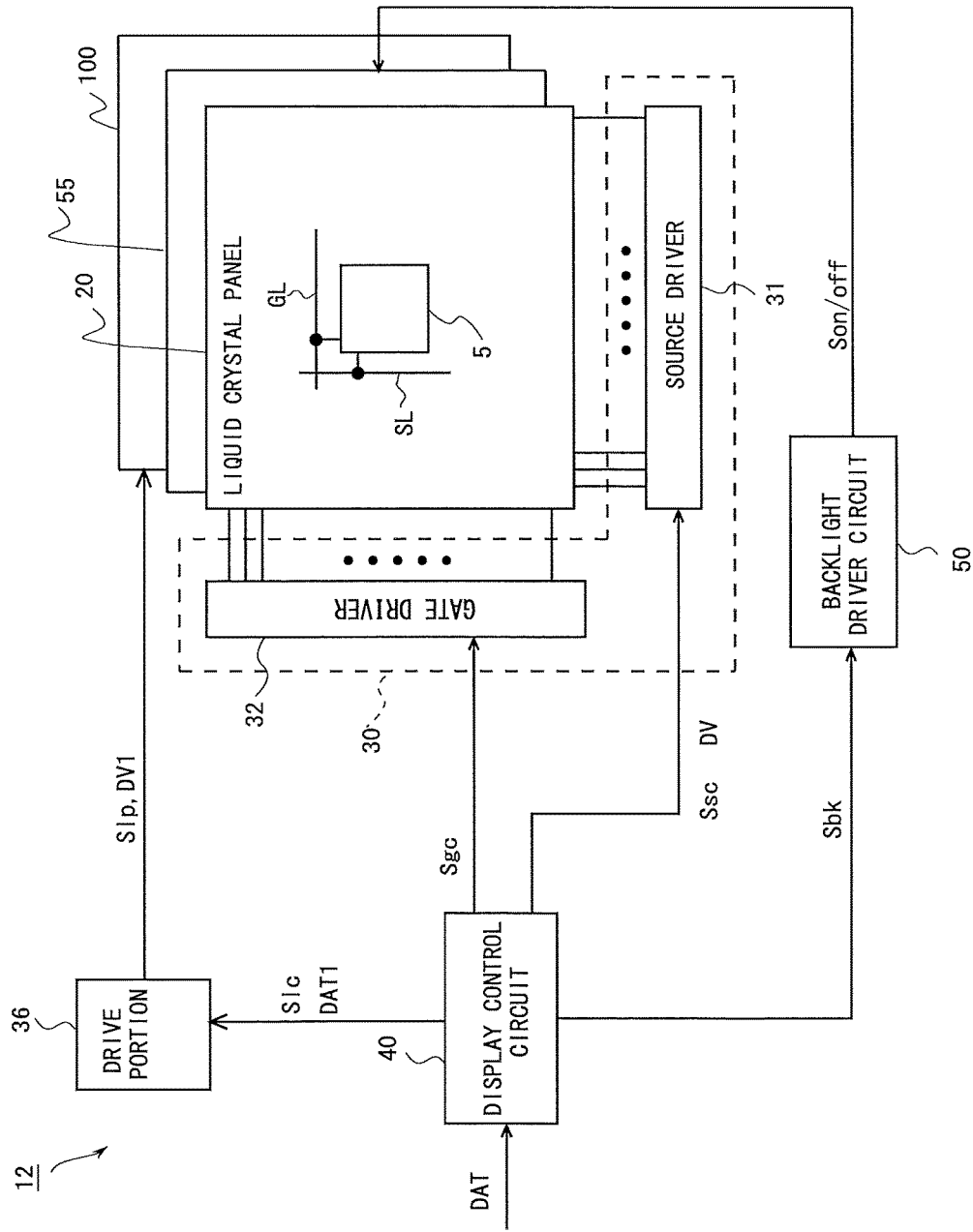
FIG. 16 is a block diagram illustrating the configuration of a liquid crystal display device according to a sixth embodiment.

FIG. 16 is a block diagram illustrating the configuration of a liquid crystal display device 12 according to a sixth embodiment of the present invention. The liquid crystal display device 12 includes a liquid crystal panel (also referred to as a "second display panel") 100, which has absorptive polarizing plates (not shown) affixed to front and back surfaces and is disposed behind the light guiding plate 60 in the liquid crystal display device 10 shown in FIG. 1. Moreover, there is provided a drive portion 36 for driving the liquid crystal panel 100. The drive portion 36 generates a drive signal $S_{lp}$ in accordance with a control signal $S_{lc}$ provided by the display control circuit 40, and drives the liquid crystal panel 100 by means of the drive signal $S_{lp}$. Other components included in the liquid crystal display device 12 are the same as the components of the liquid crystal display device 10 shown in FIG. 1 and therefore denoted by the same reference characters, and any descriptions thereof will be omitted.

<6.1 Configuration of the Display Portion>

Figure 17:
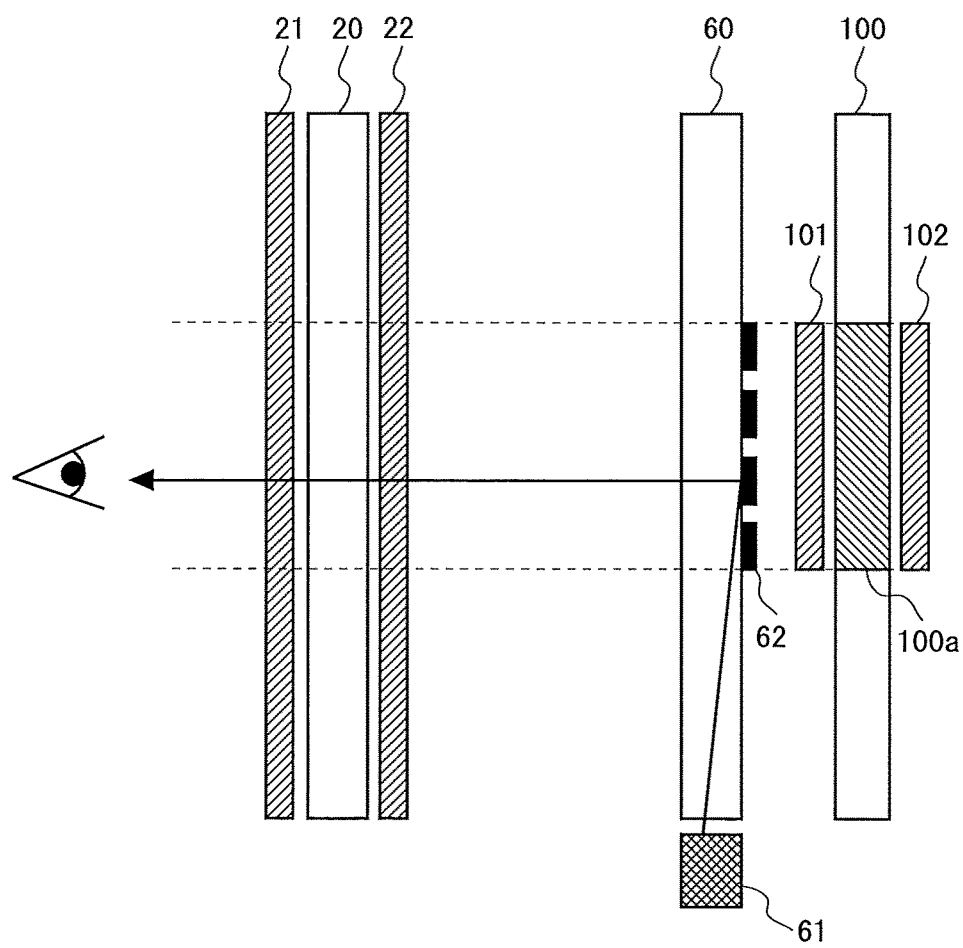
FIG. 17 is a diagram illustrating the configuration of a display portion of the liquid crystal display device according to the sixth embodiment.

FIG. 17 is a diagram illustrating the configuration of a display portion 91 of the liquid crystal display device according to the present embodiment. The display portion 91 of the present embodiment includes the liquid crystal panel 100 provided behind the light guiding plate 60 and having the absorptive polarizing plates 101 and 102 respectively affixed to the front and back surfaces. The liquid crystal panel 100 is the same size as the light guiding plate 60, and includes a liquid crystal area 100a, which is injected with liquid crystals and provided only in the position that corresponds to the light-emitting area 71 of the light guiding plate 60. Each of the two absorptive polarizing plates 101 and 102 is the same size as the liquid crystal area 100a and is affixed so as to sandwich the liquid crystal area 100a therebetween. The liquid crystal panel 100 is, so to speak, a pixel-less panel. Moreover, the two absorptive polarizing plates 101 and 102 are affixed to the liquid crystal panel 100 such that their respective transmission axes are oriented in the same direction.

The liquid crystal panel 100 functions as an active shutter (referred to below as a "shutter") in which a voltage applied to the liquid crystal area 100a is controlled to render the liquid crystal area 100a in a transparent state to transmit light therethrough or in a light-shielding state to block light. Accordingly, it is possible to render the liquid crystal panel 100 in a transparent state so as to allow ambient light incident from the back side to be transmitted to the front side, or to render the liquid crystal panel 100 in a light-shielding state so as not to transmit light escaping from the light guiding plate 60 through to the back side.

It should be noted that instead of using the two absorptive polarizing plates 101 and 102 sandwiching the liquid crystal panel 100, two reflective polarizing plates may be used. In the case where the reflective polarizing plates are affixed to the liquid crystal panel 100, the liquid crystal panel 100 functions not only as a shutter but also as an active reflective plate capable of actively switching between the states of being transparent and reflective. When the switching to the reflective state is made, light escaping from the light guiding plate 60 toward the back side is reflected back to the light guiding plate 60, and therefore, the intensity of an image displayed in the image display area 75 can be increased. Thus, light escaping from the light guiding plate 60 toward the back side can be utilized efficiently.

Furthermore, the liquid crystals are injected into the entire liquid crystal panel 100 rather than only the area of the liquid crystal panel 100 that corresponds to the light-emitting area 71, and the polarizing plates affixed to the front and back surfaces of the liquid crystal panel 100 are sized to be the same size as the light-emitting area 71. As a result, as in the case where the liquid crystals are injected into only a part of the liquid crystal panel 100, the liquid crystal panel 100 functions as an active shutter. In this case, the polarizing plates affixed to the front and back surfaces of the liquid crystal panel 20 may be either absorptive polarizing plates or reflective polarizing plates.

Furthermore, allowing the liquid crystal panel 100 provided behind the light guiding plate 60 to serve as a shutter, as in the present embodiment, can be applied to the display portions in the first embodiment, the first and second variants thereof, the second embodiment, the first and second variants thereof, and the third embodiment, thereby achieving similar effects to those achieved by the present embodiment.

<6.2 Effects>

In the present embodiment, the shutter, including the liquid crystal panel 100 disposed behind the light guiding plate 60, is closed whereby light escaping from the light guiding plate 60 can be prevented from being transmitted through to the back side. Thus, the glare of the liquid crystal display device viewed from the back side is reduced. On the other hand, by opening the shutter, ambient light incident from the back side is transmitted through from the back to the front side, so that the background can be seen through the panel from the front side. Further, in the case where two reflective polarizing plates are affixed to the liquid crystal panel 100 in place of the two absorptive polarizing plates 101 and 102, the liquid crystal panel 100 maintains the shutter function and also functions as an active reflective plate capable of switching between the states of being transparent and reflective under control of an applied voltage. Accordingly, when the state is switched from transparent to reflective, light escaping from the light guiding plate 60 toward the back side is reflected toward the liquid crystal panel 20 by the reflective polarizing plates. Thus, light escaping from the light guiding plate 60 toward the back side can be utilized efficiently.

Furthermore, the liquid crystal panel 100 is a pixel-less panel, and therefore, no pattern is overlaid on the pixel pattern of the liquid crystal panel 20. Thus, there occurs no moire pattern.

<6.3 Variants>

Figure 18:
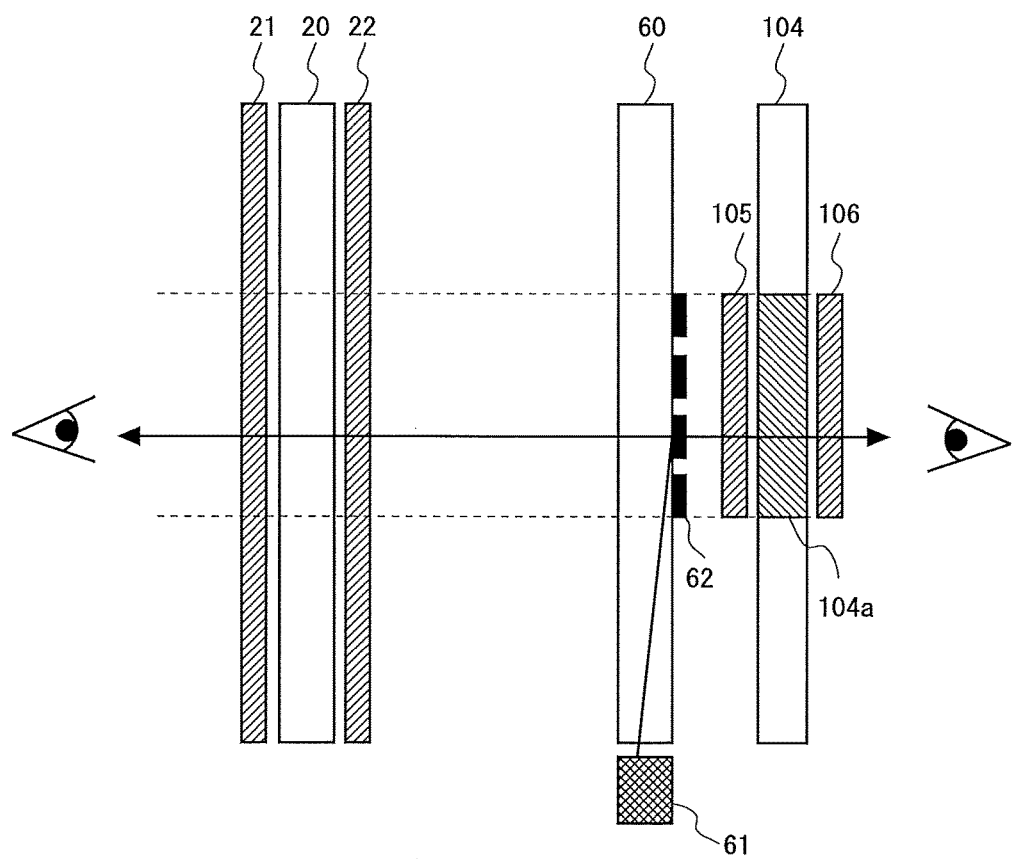
FIG. 18 is a diagram illustrating the configuration of a display portion of a liquid crystal display device according to a variant of the sixth embodiment.

FIG. 18 is a diagram illustrating the configuration of a display portion 92 of a liquid crystal display device according to a variant of the present embodiment. The liquid crystal panel 100 disposed behind the light guiding plate 60 in the display portion 91 shown in FIG. 17 is a pixel-less liquid crystal panel, but in the display portion 92 shown in FIG. 18, a liquid crystal panel 104 disposed behind the light guiding plate 60 is a liquid crystal panel with a plurality of pixels formed therein. By disposing the liquid crystal panel 104 with the pixels behind the light guiding plate 60, the liquid crystal panel 104 can use light escaping from the light guiding plate 60 toward the back side, as backlight to display an image (also referred to as a "second image") based on image data DAT1 (referred to as "second image information") included in externally provided image data DAT. In this manner, the liquid crystal display device functions as a double-sided display to present different images on the liquid crystal panel 20 and the liquid crystal panel 104. In this case, an image signal generated from digital image data DV1 provided by the drive portion 36 is written to each pixel of the liquid crystal panel 104, and light escaping from the light guiding plate 60 toward the back side illuminates the liquid crystal panel 104 as backlight, whereby the liquid crystal panel 104 is able to display an image different from an image displayed on the liquid crystal panel 20.

The liquid crystal panel 104 has absorptive polarizing plates 105 and 106 affixed to opposite surfaces of a liquid crystal area 104a corresponding to the light-emitting area 71 of the light guiding plate 60. In this case, the appearance in the state of being transparent varies depending on the relationship between the transmission axes of the absorptive polarizing plates 22 and 105 affixed to the opposite surfaces that sandwich the light guiding plate 60, and therefore, such different appearances will be described below.

In the case where these two absorptive polarizing plates 105 and 106 are disposed with the transmission axes parallel to each other, the display portion 92 is rendered transparent so that the liquid crystal display device can be seen from the front to the back side through the two liquid crystal panels 20 and 104. Accordingly, in the case where the liquid crystal panels 20 and 104 display images as a double-sided display, an image and a background are superimposed on each other on each of the liquid crystal panels 20 and 104, resulting in a problem with unclear images.

On the other hand, the two absorptive polarizing plates 105 and 106 are disposed with the transmission axes perpendicular to each other, the display portion 92 is not rendered transparent so that the back side cannot be seen from the front side through the two liquid crystal panels 20 and 104 and nor can the front side be seen from the back side through the liquid crystal panels 20 and 104. Thus, both images displayed on the liquid crystal panels 20 and 104 can be seen clearly.

It should be noted that both of the liquid crystal panels 20 and 104 have regular pixel patterns, and therefore, a moire pattern might be caused by the pixel patterns overlying each other. Accordingly, it is preferable to take measures against the occurrence of a moire pattern by designing the pixel patterns to be resistant to a moire pattern or by forming the pixel pattern of one of the liquid crystal panels only in the area that corresponds to the light-emitting area of the light guiding plate.

Furthermore, as in the case of the display portion 91 shown in FIG. 17, reflective polarizing plates may be affixed, in place of the absorptive polarizing plates 105 and 106, so as to sandwich the liquid crystal panel 104. Moreover, the entire liquid crystal panel 104 may be used as the liquid crystal area 104a. In this case, the polarizing plates that sandwich the liquid crystal panel 104 are affixed only in the area that corresponds to the light-emitting area 71.

Furthermore, as in the present embodiment, providing the liquid crystal panel 104 behind the light guiding plate 60 to achieve a double-sided display can be applied to the display portions in the first embodiment, the first and second variants thereof, the second embodiment, the first and second variants thereof, and the third embodiment, thereby achieving similar effects to those achieved by the present embodiment.

In the present variant, the liquid crystal display device has the liquid crystal panel 104 disposed behind the light guiding plate 60, and the liquid crystal panel 104 not only functions as a shutter by which light escaping from the light guiding plate 60 is inhibited from further reaching the back side but also displays an image different from, or the same image as, an image displayed on the liquid crystal panel 20, by being provided with image data DAT1. Thus, the liquid crystal display device functions as a double-sided display.

INDUSTRIAL APPLICABILITY

The present invention is applied to display devices that not only display images on the basis of image data but also function as see-through displays through which backgrounds are seen.

DESCRIPTION OF THE REFERENCE CHARACTERS 5 pixel
10, 11, 12 liquid crystal display device (display device)
20 liquid crystal panel (first display panel)
21, 22, 28 absorptive polarizing plate
23, 24 reflective polarizing plate
26 scattering liquid crystal panel
26a scattering area
27 light-shielding plate
27a light-shielding area
30 drive portion
40 display control circuit
55 backlight unit (display light source)
60 light guiding plate
61 light source
62 dot
63 scattering film
64 coating film
65 stack
71 light-emitting area
72 light-transmissive area
75 image display area
76 transparent display area
80 to 92 display portion
100, 104 liquid crystal panel (second display panel)
100a, 104a liquid crystal area
101, 102, 105, 106 absorptive polarizing plate

The invention claimed is:

1. A display device functioning as a see-through display, the device comprising:
    a first display panel configured to control a polarization direction of light on the basis of externally provided first image information, thereby displaying a first image or becoming transparent to allow ambient light incident from a back side to be transmitted therethrough to display a background;
    first and second polarizing plates respectively affixed to front and back surfaces of the first display panel; and
    a display light source including a light guiding plate configured to emit incident light toward the first display panel and a light source attached to an edge of the light guiding plate, the display light source being configured to irradiate the first display panel with light emitted by the light source via the light guiding plate, wherein,
    the first display panel includes an image display area in which the first image is displayed and a transparent display area in which the background is displayed, the transparent display area surrounding the image display area, and
    the light guiding plate includes a light-emitting area and a light-transmissive area, the light-emitting area directing light emitted by the light source toward the image display area, the light-transmissive area transmitting ambient light incident from the back side therethrough toward the transparent display area.

2. The display device according to claim 1, wherein the light-emitting area formed in the light guiding plate has formed on a front or back surface a dot pattern with a plurality of dots for reflecting or scattering incident light from the light source.

3. The display device according to claim 2, further comprising a scattering liquid crystal panel between the second polarizing plate affixed to the back surface of the first display panel and the light guiding plate, the scattering liquid crystal panel being the same size as the image display area and having a scattering area injected with scattering liquid crystals, wherein, the scattering area is formed in a position corresponding to the light-emitting area and becomes transparent or cloudy depending on whether a voltage is applied to the scattering area.

4. The display device according to claim 1, wherein the light-emitting area formed in the light guiding plate has a scattering film containing a scattering material and affixed to a front or back surface or a coating film formed of the scattering material on the front or back surface, the scattering material scattering incident light from the light source.

5. The display device according to claim 4, wherein the scattering film or the coating film has a haze of 10% or less.

6. The display device according to claim 1, wherein each of the first and second polarizing plates has the same size as the image display area formed in the first display panel.

7. The display device according to claim 6, wherein at least the second polarizing plate and the scattering film containing the light-scattering material for scattering incident light from the light source are stacked, first and second adhesive layers respectively adhere to front surfaces of the second polarizing plate and the scattering film, and the stack is fixed between the first display panel and the light guiding plate by sticking the first adhesive layer to the image display area and the second adhesive layer to the light emitting area.

8. The display device according to claim 6, wherein both the first and second polarizing plates are absorptive polarizing plates.

9. The display device according to claim 8, further comprising a second reflective polarizing plate having the same size as the second polarizing plate, wherein the second reflective polarizing plate and the second polarizing plate are affixed to the back surface of the first display panel in this order.

10. The display device according to claim 8, further comprising a first reflective polarizing plate having the same size as the first polarizing plate, wherein the first reflective polarizing plate is affixed to a front surface of the first polarizing plate.

11. The display device according to claim 1, wherein each of the first and second polarizing plates is the same size as the first display panel.

12. The display device according to claim 11, further comprising a third reflective polarizing plate having the same size as the first display panel, wherein the third reflective polarizing plate and the second polarizing plate are affixed to the back surface of the first display panel in this order.

13. The display device according to claim 11, further comprising a light-shielding plate with a light-shielding area formed of a blackout material in a position corresponding to the light-emitting area, wherein the light-shielding plate is disposed behind the light guiding plate.

14. The display device according to claim 11, further comprising a third polarizing plate having the same size as the light guiding plate, wherein the third polarizing plate is disposed behind the light guiding plate.

15. The display device according to claim 11, further comprising a second display panel including a liquid crystal area injected with liquid crystals, wherein the liquid crystal area is sandwiched between two polarizing plates disposed behind the light guiding plate, each polarizing plate having the same size as the liquid crystal area.

16. The display device according to claim 15, wherein the liquid crystal area is a single area switching between states of being transparent and light-shielding in accordance with an applied voltage.

17. The display device according to claim 15, wherein the liquid crystal area includes a plurality of pixels and displays a second image different from the first image with the pixels by controlling a polarization direction of light escaping from the display light source toward the back side, on the basis of externally provided second image information.

18. The display device according to claim 17, wherein the two polarizing plates have respective transmission axes parallel to each other.

19. The display device according to claim 17, wherein the two polarizing plates have respective transmission axes perpendicular to each other.

\* \* \* \* \*